US008665186B2

(12) United States Patent
Ono

(10) Patent No.: US 8,665,186 B2
(45) Date of Patent: Mar. 4, 2014

(54) IMAGE DISPLAY DEVICE AND METHOD OF DRIVING THE SAME

(75) Inventor: Shinya Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 29 days.

(21) Appl. No.: 13/299,629

(22) Filed: Nov. 18, 2011

(65) Prior Publication Data

US 2012/0062618 A1 Mar. 15, 2012

Related U.S. Application Data

(63) Continuation of application No. PCT/JP2010/003414, filed on May 21, 2010.

(30) Foreign Application Priority Data

May 26, 2009 (JP) ................................. 2009-126839

(51) Int. Cl.
*G06F 3/038* (2013.01)
*G09G 5/00* (2006.01)
*G09G 3/30* (2006.01)

(52) U.S. Cl.
USPC ............................................... 345/76; 345/77

(58) Field of Classification Search
USPC ..................... 345/204–215, 690–699, 76–83; 315/169.1–169.4
See application file for complete search history.

(56) References Cited

U.S. PATENT DOCUMENTS

| | | | | |
|---|---|---|---|---|
| 7,397,447 | B2 * | 7/2008 | Matsumoto | 345/76 |
| 7,492,336 | B2 * | 2/2009 | Kim | 345/76 |
| 2003/0095087 | A1 * | 5/2003 | Libsch et al. | 345/82 |
| 2004/0233141 | A1 * | 11/2004 | Matsumoto | 345/76 |
| 2004/0239596 | A1 * | 12/2004 | Ono et al. | 345/76 |
| 2005/0168491 | A1 * | 8/2005 | Takahara et al. | 345/690 |
| 2005/0219166 | A1 * | 10/2005 | Kim | 345/76 |
| 2006/0119552 | A1 * | 6/2006 | Yumoto | 345/76 |
| 2006/0187153 | A1 * | 8/2006 | Nathan et al. | 345/76 |
| 2006/0221015 | A1 * | 10/2006 | Shirasaki et al. | 345/77 |

(Continued)

FOREIGN PATENT DOCUMENTS

| | | |
|---|---|---|
| JP | 2008-122633 | 5/2008 |
| JP | 2008-259166 | 10/2008 |

(Continued)

OTHER PUBLICATIONS

International Search Report for PCT/JP2010/003414, dated Aug. 10, 2010.

*Primary Examiner* — Amr Awad
*Assistant Examiner* — Roberto Flores
(74) *Attorney, Agent, or Firm* — Greenblum & Bernstein, P.L.C.

(57) ABSTRACT

The image display device includes: a plurality of pixels arranged in a matrix, each of which includes a driving transistor which converts a signal voltage which determines luminous intensity into a driving current; a luminescence element which generates photons according to the driving current flowing through it; and a threshold voltage detecting unit which detects a threshold voltage of the driving transistor while a reference voltage is applied. The pixels make up two or more driving blocks each of which includes a plurality of pixel rows. The image display device controls supply of the reference voltage and a power source voltage to all pixels in the same driving block with the same timing in a predetermined period and controls supply of the reference voltage and the power source voltage to all pixels in different blocks with different timings.

6 Claims, 11 Drawing Sheets

(56) References Cited

U.S. PATENT DOCUMENTS

| | | | | |
|---|---|---|---|---|
| 2008/0043005 | A1 * | 2/2008 | Kanda | 345/204 |
| 2008/0225145 | A1 | 9/2008 | Sonoda | |
| 2008/0291125 | A1 | 11/2008 | Yamashita et al. | |
| 2009/0122047 | A1 | 5/2009 | Yamamoto et al. | |
| 2009/0189924 | A1 * | 7/2009 | Ogura | 345/690 |
| 2009/0225009 | A1 * | 9/2009 | Ka | 345/76 |
| 2009/0244049 | A1 | 10/2009 | Yamamoto et al. | |
| 2009/0244050 | A1 * | 10/2009 | Yamamoto et al. | 345/212 |
| 2009/0244055 | A1 * | 10/2009 | Asano et al. | 345/214 |

FOREIGN PATENT DOCUMENTS

| | | |
|---|---|---|
| JP | 2008-287139 | 11/2008 |
| JP | 2009-139928 | 6/2009 |
| JP | 2009-237041 | 10/2009 |
| JP | 2009-244665 | 10/2009 |
| JP | 2010-054564 | 3/2010 |

* cited by examiner

Pixel in odd-numbered block

Pixel in even-numbered block

Pixel in odd-numbered block

Pixel in even-numbered block

IMAGE DISPLAY DEVICE AND METHOD OF DRIVING THE SAME

CROSS REFERENCE TO RELATED APPLICATION

This is a continuation application of PCT application No. PCT/JP2010/003414 filed on May 21, 2010, designating the United States of America.

BACKGROUND OF THE INVENTION (1) Field of the Invention

The present invention relates to image display devices and methods of driving the same and, in particular, to an image display device using current-driven luminescence elements and a method of driving the same.

(2) Description of the Related Art

Image display devices using organic electro luminescence (EL) elements are well-known as image display devices using current-driven luminescence elements. An organic EL display device using such organic EL elements which spontaneously generate photons does not require backlights needed in a liquid crystal display, and is therefore ideally suited to achieving reduction of thickness of the devices. In addition, since the organic EL displays have an unrestricted viewing angle, the organic EL displays are expected to be put into practical use as a next-generation display device. Unlike liquid-crystal cells, which are controlled by a voltage applied to them, the luminance of each organic EL element used in the organic EL display devices is controlled by a current flowing through that element.

In organic EL display devices in general, organic EL elements constituting pixels are arranged in a matrix. An organic EL display device in which an organic EL element is provided at a crosspoint of each of a plurality of row electrodes (scanning lines) and each of a plurality of column electrodes (data lines) and a voltage corresponding to a data signal is applied between a selected row electrode and a plurality of column electrodes to drive the organic EL element is called a passive-matrix organic EL display device.

On the other hand, in an organic EL display device called an active-matrix organic EL display device, a switching thin film transistor (TFTs) is provided at a crosspoint of each of a plurality of scanning lines and each of a plurality of data lines, a gate of a driving element is connected to the switching TFT, and the switching TFT is turned on through a selected scanning line to input a data signal through a signal line into the driving element, which then drives an organic EL element.

Unlike the passive-matrix organic EL display device in which each organic EL element connected to each row electrode (scanning line) generates photons only in a period during which the row electrode (scanning line) is selected, the active-matrix organic EL display device can keep organic EL elements generating photons until the next scan (selection). Therefore the luminance of the display of the active-matrix organic EL display device does not decrease as the number of scanning lines increases. Accordingly, the active-matrix organic EL display device can be driven by a low voltage, achieving low power consumption. However, the active-matrix organic EL display suffers from luminance unevenness because different currents flow into the organic EL elements in individual pixels due to variations in characteristics of the driving transistors even when the same data signal is provided to the organic EL elements.

To address the problem, Japanese Unexamined Patent Application Publication No. 2008-122633 discloses a method of compensating for luminance unevenness caused by variations in characteristics of driving transistors. The method uses a simple pixel circuit to compensate for variations in characteristics among pixels.

FIG. 10 is a block diagram illustrating a configuration of the conventional image display device described in Japanese Unexamined Patent Application Publication No. 2008-122633. The image display device 500 illustrated in FIG. 10 includes a pixel array unit 502 and a driving unit which drives the pixel array unit 502. The pixel array unit 502 includes scanning lines 701 to 70*m* arranged in rows, signal lines 601 to 60*n* arranged in columns, pixels 501 in a matrix each of which is disposed at a crosspoint of each of the scanning lines and each of the signal lines, and power supply lines 801 to 80*m* arranged in rows. The driving unit includes a signal selector 503, a scanning line driving unit 504, and a power supply line driving unit 505.

The scanning line driving unit 504 supplies a control signal to the scanning lines 701 to 70*m* in sequence in a horizontal period (1H) to sequentially scan the pixels 501 row by row. The power supply line driving unit 505 supplies a power source voltage that switches between first and second voltages to the power supply lines 801 to 80*m* in synchronization with the line-sequential scan. The signal selector 503 selects one of a luminance signal voltage which represents a video signal and a reference voltage in synchronization with the line-sequential scan and supplies the selected voltage to the signal lines 601 to 60*n* in columns.

Here, two of the column signal lines 601 to 60*n* are disposed in each column; one of the two signal lines supplies the reference voltage and the signal voltage to the pixels 501 in odd-numbered rows and the other supplies the reference voltage and signal voltage to the pixels 501 in even-numbered rows.

FIG. 11 is a circuit diagram of a luminescent pixel of the conventional image display device described in Japanese Unexamined Patent Application Publication No. 2008-122633. FIG. 11 shows the pixel 501 in the first row in the first column. A scanning line 701, a power supply line 801, and signal lines 601 are provided for the pixel 501. One of the two signal lines 601 is connected to the pixel 501. The pixel 501 includes a switching transistor 511, a driving transistor 512, a storing capacitive element 513, and a luminescence element 514. A gate of the switching transistor 511 is connected to the scanning line 701, one of a source and drain of the switching transistor 511 is connected to the signal line 601, and the other is connected to a gate of the driving transistor 512. A source of the driving transistor 512 is connected to an anode of the luminescence element 514 and a drain of the driving transistor 512 is connected to the power supply line 801. The luminescence element 514 has a cathode connected to a ground line 515. The storing capacitive element 513 is connected to the source and gate of the driving transistor 512.

In the configuration described above, the power supply line driving unit 505 switches the power supply line 801 from a first voltage (high voltage) to a second voltage (low voltage) while the reference voltage is on the signal lines 601. While the reference voltages is also on the signal line 601, the scanning line driving unit 504 drives the voltage on the scanning line 701 to an "H" level to bring the switching transistor 511 into conduction, thereby applying the reference voltage to the gate of the driving transistor 512, and sets the voltage at the source of the driving transistor 512 to the second voltage, which is a reset voltage. With the operation described above, preparation for compensating for a threshold voltage Vth of the driving transistor 512 is completed. Then, the power supply line driving unit 505 switches the voltage on the power supply line 801 from the second voltage to the first voltage to cause the storing capacitive element 513 to store a voltage corresponding to the threshold voltage Vth of the driving transistor 512 during a correction period before a voltage on the signal line 601 is switched from the reference voltage to the signal voltage. The power supply line driving unit 505 then drives the voltage at the switching transistor 511 to the "H" level to cause the storing capacitive element 513 to store the signal voltage. That is, the signal voltage is added to the voltage corresponding to the threshold voltage Vth of the driving transistor 512 that has been previously stored and is stored in the storing capacitive element 513. The driving transistor 512 is supplied with a current through the power supply line 801 at the first voltage and provides a driving current equivalent to the stored voltage to the luminescence element 514.

In the operation described above, the two signal lines 601 are disposed in each column to increase the time period during which each signal line is at the reference voltage. In this way, a correction period for storing the voltage corresponding to the threshold voltage Vth of the driving transistor 512 in the storing capacitive element 513 is provided.

FIG. 12 is a timing chart of an operation of the image display device described in Japanese Unexamined Patent Application Publication No. 2008-122633. Shown in FIG. 12 are waveforms of signals on the scanning line 701 and the power supply line 801 in the first line, the scanning line 702 and the power supply line 802 in the second line, the scanning line 703 and power supply line 803 in the third line, a signal line assigned to pixels in an odd-numbered row, and a signal line assigned to pixels in an even-numbered row. A scanning signal to be applied to the scanning lines shifts from line to line in each horizontal period (1H). A scanning signal applied to one scanning line includes two pulses. The time width of the first pulse is longer, equal to or greater than 1H; the time width of the second pulse is smaller, a fraction of 1H. The first pulse corresponds to the threshold correction period described above and the second pulse corresponds to a signal voltage sampling period and a mobility correction period. Also a power supply pulse supplied onto the power supply line shifts from line to line in a 1H period. A signal voltage, on the other hand, is applied to each signal line once in 2H and therefore a period equal to or longer than 1H during which the signal line is at the reference voltage can be provided.

In the conventional image display device described in Japanese Unexamined Patent Application Publication No. 2008-122633, a threshold voltage correction period is provided as described above even when the threshold voltage Vth of the driving transistor 512 varies among pixels and therefore the variations are cancelled from one pixel to another to prevent luminance unevenness of an image.

SUMMARY OF THE INVENTION

However, although two signal lines are disposed in each pixel column in the conventional image display device and the driving method described in Japanese Unexamined Patent Application Publication No. 2008-122633, the period in which the threshold voltage Vth of the driving transistor is corrected is less than 2H, which is insufficient for an image display device requiring a highly accurate correction.

Furthermore, in the conventional image display device and driving method described in Japanese Unexamined Patent Application Publication No. 2008-122633, the signal level of the scanning line and the power supply line disposed in each pixel row is frequently turned on and off. Accordingly, signal output loads on the scanning line driving circuit and the power line driving circuit increase because the switching frequency of the signals outputted from the driving circuits increases. The increases become remarkable as the size of the display panel increases, because the number of rows increases accordingly. Moreover, as the signal switching frequency increases, more power is consumed for charging and discharging parasitic capacitance which exists particularly on the data lines.

In light of the problems described above, an object of the present invention is to provide an image display device and a method of driving the image display device wherein a period in which a threshold voltage of a driving transistor can be corrected with high accuracy is provided. Another object of the present invention is to provide an image display device in which output loads on driving circuits are reduced and a method of driving the image display device.

In order to achieve the aforementioned object, the image display device according to an aspect of the present invention is an image display device including a plurality of pixels arranged in rows and columns. Each of the pixels includes: a driving transistor which converts a signal voltage which determines luminous intensity into a driving current according to the signal voltage applied to a gate of the driving transistor; a luminescence element which generates photons in response to the driving current flowing through the luminescence element; and a threshold voltage detecting unit configured to detect a threshold voltage of the driving transistor while the reference voltage is applied to the gate of the driving transistor. The pixels make up at least two or more driving blocks each of which includes a plurality of the rows. The image display device further includes a control unit configured to control supply of the reference voltage and a power source voltage to all of the pixels in a same one of the driving blocks with a same timing in a predetermined period to cause all of the threshold voltage detecting units in the same one of the driving blocks to detect the threshold voltage simultaneously, and to control supply of the reference voltage and the power source voltage with a timing different from the timing in different ones of the driving blocks.

With the configuration described above, the threshold voltages of the driving transistors can be detected in the same period and up to one frame period divided by the number of the driving blocks can be allocated as a threshold voltage detection period. Consequently, a driving current corrected with high accuracy flows through pixels and therefore image display quality can be improved. Furthermore, since the control unit controls the supply of the reference voltage and power source voltage in a driving block simultaneously in the threshold voltage detection period. That is, since the control unit can output the same control signal to the same driving block, output load on the control unit is reduced.

Furthermore, the signal voltage and the reference voltage are applied to the gate of the driving transistor of a pixel in a k-th one of the driving blocks through a first signal line disposed in each of the columns, where k is a natural number, the signal voltage and the reference voltage are applied to the gate of the driving transistor of a pixel in a (k+1)-th one of the driving blocks through a second signal line disposed in each of the columns, and the control unit is configured to supply the signal voltage and the reference voltage mutually exclusively to the first signal line and the second signal line.

With the configuration described above, a threshold voltage correction period in which the reference voltage is applied to the (k+1)-th driving block for threshold voltage correction is provided in a period during which a signal voltage is sampled in the k-th block. Thus, the threshold voltage correction period is not divided among the pixels but can be divided among the driving blocks. Accordingly, the larger the display area, the longer the threshold voltage correction period can be provided relative to the area.

Furthermore, the image display device further includes: a scanning line disposed in each of the rows; a first power source line which is disposed in each of the rows and supplies a first voltage lower than a reference voltage and a second voltage higher than the reference voltage; and a second power source line. The threshold voltage detecting unit includes a storing capacitive element having a terminal connected to the gate of the driving transistor and another terminal connected to one of the source and the drain of the driving transistor, and storing at least a voltage corresponding to the signal voltage or the reference voltage. The other of the source and drain of the driving transistor is connected to the first power source line, and the luminescence element includes a terminal connected to the second power source line and another terminal connected to one of a source and a drain of the driving transistor. Each of the pixels in the k-th driving block further includes: a first selecting transistor which includes a gate, a source, and a drain, the gate being connected to the scanning line, one of the source and the drain being connected to the first signal line, and the other of the source and the drain being connected to the gate of the driving transistor, and the first selecting transistor switching between conduction and non-conduction between the first signal line and the gate of the driving transistor, and each of the pixels in the (k+1)-th driving block further includes: a second selecting transistor which includes a gate, a source, and a drain, the gate being connected to the scanning line, one of the source and the drain being connected to the second signal line, the other of the source and the drain being connected to the gate of the driving transistor, and second selecting transistor switching between conduction and non-conduction between the second signal line and the gate of the driving transistor. The control unit is configured to variably drive the power source voltage to be supplied to the first power source line, and, in a period in which the reference voltage is being supplied to the first signal line, change the voltage of all of the first power source lines disposed in the k-th driving block from the first voltage to the second voltage at the same timing, and in a period in which the reference voltage is being supplied to the second signal line, change the voltage of all of the first power source lines disposed in the (k+1)-th driving block from the first voltage to the second voltage at the same driving timing, so that the driving timing is the same in all periods for all of the first power source lines disposed in the same one of the driving blocks.

With the configuration described above, a load on the control unit can be reduced because the same power source voltage can be supplied to all of the first power source lines disposed in the same driving block in a threshold voltage detection period during the voltage supply to the first power source lines, which are power source lines for the driving transistors. Furthermore, an accurate threshold correction can be achieved by controlling the voltage on the first power source lines with a basic driving circuit configuration made up of a driving transistor, a selecting transistor, and a storing capacitive element without additional circuit components.

Furthermore, all of the first power source lines disposed in the same one of the driving blocks may be connected in common, and the control unit may be configured to drive the power source voltage with the same timing in all periods for all of the first power source lines disposed in the same one of the driving blocks.

In a method that controls a driving current for driving transistors by a power source voltage, first power source lines in the same driving block are driven simultaneously in a threshold voltage correction period, but are driven sequentially in the order of pixel rows during storing of a signal voltage into the storing capacitive elements and photon generation, and accordingly the first power source lines need to be driven sequentially in the order of pixel rows during optical quenching. In another method, in contrast, a period during which a zero voltage is supplied can be provided for a signal voltage supplied from the signal line to each pixel row, and the selecting transistors can be brought into conduction during the zero-voltage period to write the zero voltage in the gate of the driving transistors to optically quench the pixel row simultaneously. According to this method, the first power source lines in the same driving block do not need to be individually driven during optical quenching as well a threshold voltage detection period. Therefore, first power source lines disposed in the same driving block can be connected in common and the number of output lines from the control unit can be reduced.

The present invention can be embodied not only as an image display device including the distinctive means described above but also as an image display device driving method including steps corresponding to the distinctive means included in the image display device.

In the image display device and the method of driving the image display device according to the present invention, a threshold voltage of driving transistors in a driving block can be corrected in the same period and the same timing. Accordingly, a large part of one frame period can be allocated to the correction period and therefore a driving current corrected with high accuracy flows into luminescence elements, thus improving the image display quality. Furthermore, since the frequency of switching of the level of a signal outputted from the control unit during the correction period can be reduced, the output load on the control unit is reduced.

FURTHER INFORMATION ABOUT TECHNICAL BACKGROUND TO THIS APPLICATION

The disclosure of Japanese Patent Application No. 2009-126839 filed on May 26, 2009 including specification, drawings and claims is incorporated herein by reference in its entirety.

The disclosure of PCT application No. PCT/JP2010/003414 filed on May 21, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

First Embodiment

The image display device according to the present embodiment is an image display device including a plurality of pixels arranged in rows and columns. Each of the pixels includes: a driving transistor which converts a signal voltage which determines luminous intensity into a driving current; a luminescence element which generates photons in response to the driving current flowing through the luminescence element; and a threshold voltage detecting unit configured to detect a threshold voltage of the driving transistor. The pixels make up at least two or more driving blocks each of which includes a plurality of the rows. Furthermore, the image display device further includes a control unit configured to control supply of the reference voltage and a power source voltage to all of the pixels in a same one of the driving blocks with a same timing in a predetermined period to cause all of the threshold voltage detecting units in the same one of the driving blocks to detect the threshold voltage simultaneously. With this, it becomes possible to make the period for detecting the threshold voltage of the driving transistor uniform within a driving block, and at most 1 frame period divided by the number of the driving blocks can be allocated for a threshold voltage detection period. Therefore, accurate driving current flows into the luminescence elements and the image display quality can be improved.

Embodiments of the present invention will be described below with reference to drawings.

Figure 1:
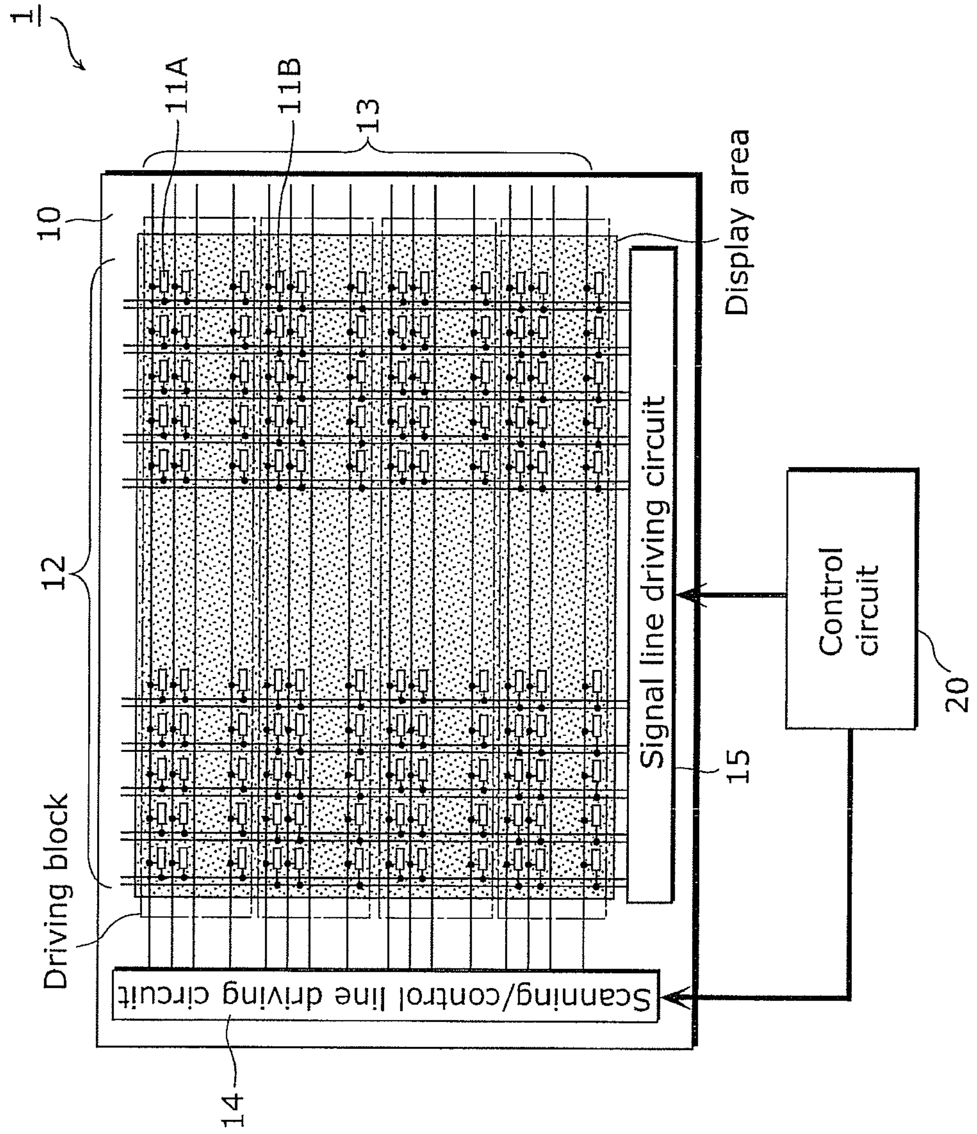
FIG. 1 is a block diagram illustrating an electrical configuration of an image display device according to a first embodiment of the present invention.

FIG. 1 is a block diagram illustrating an electrical configuration of an image display device according to a first embodiment of the present invention. The image display device 1 in FIG. 1 includes a display panel 10 and a control circuit 20. The display panel 10 includes a plurality of pixels 11A and 11B, a set of signal lines 12, a set of control lines 13, a scanning/control line driving circuit 14, and a signal line driving circuit 15.

Pixels 11A and 11B are arranged in a matrix on the display panel 10. Here, the pixels 11A and 11B make up two or more driving blocks each of which is made up of a plurality of pixel rows. The pixels 11A constitute an odd-numbered driving blocks whereas the pixels 11B constitute even-numbered driving blocks.

The set of signal lines 12 is made up of a plurality of signal lines disposed individually in each pixel column. Here, two signal lines are disposed in each pixel column. The pixels in an odd-numbered driving block are connected to one of the two signal lines and the pixels in an even-numbered driving block are connected to the other.

The set of control lines 13 is made up of scanning lines and power source lines. A scanning line and a power source line are disposed in each pixel.

The scanning/control line driving circuit 14 outputs a scanning signal to each scanning line in the set of control lines 13 and a variable voltage to each power source line in the set of control lines 13, thereby driving circuit elements of the pixels.

The signal line driving circuit 15 outputs a signal voltage which determines luminous intensity or a reference voltage for detecting a threshold voltage of driving transistors to each signal line in the set of signal lines 12, thereby driving circuit elements of the pixels.

The control circuit 20 controls the output timing and voltage level of a scanning signal and a variable voltage outputted from the scanning/control line driving circuit 14. The control circuit 20 also controls the output timing of a signal voltage or a reference voltage outputted from the signal line driving circuit 15.

It should be noted that the control circuit 20, the scanning/control line driving circuit 14, and the signal line driving circuit 15 constitute a control unit which controls operation of each pixel.

Figure 2A:
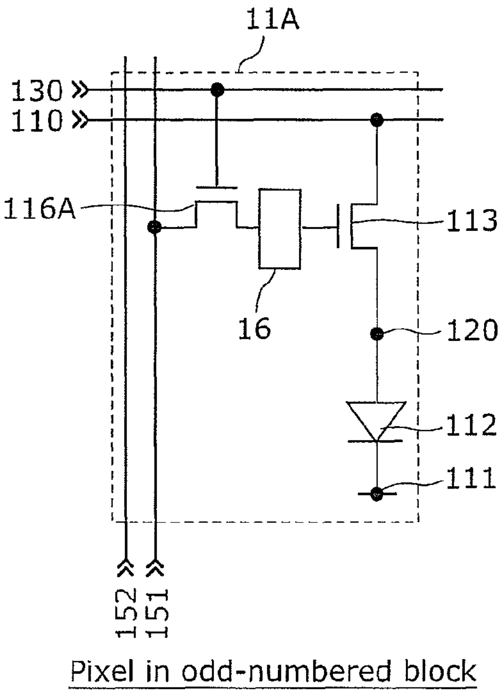
FIG. 2A is a circuit diagram of a pixel in an odd-numbered driving block in the image display device according to the first embodiment of the present invention.
Figure 2B:
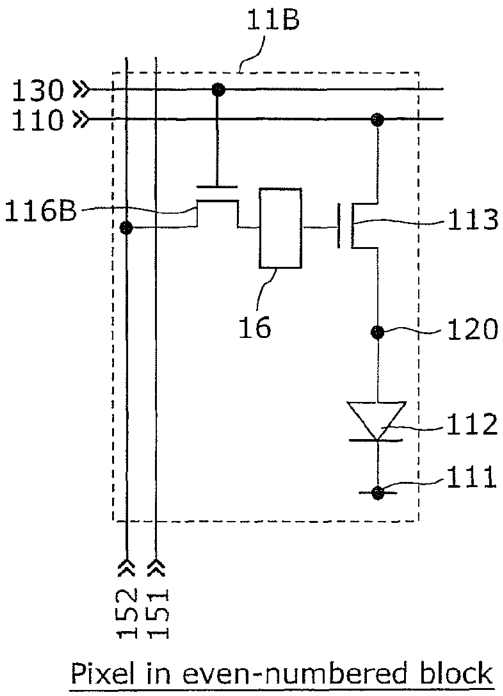
FIG. 2B is a circuit diagram of a pixel in an even-numbered driving block in the image display device according to the first embodiment of the present invention.

FIG. 2A is a circuit diagram of a pixel in an odd-numbered driving block in the image display device according to the first embodiment of the present invention. FIG. 2B is a circuit diagram of a pixel in an even-numbered driving block in the image display device according to the first embodiment of the present invention. Each of the pixels 11A and 11B illustrated in FIGS. 2A and 2B includes a threshold voltage detecting unit 16, a power source line 110, an organic EL (electroluminescence) element 112, a driving transistor 113, a scanning line 130, a first signal line 151, and a second signal line 152. The pixel 11A further includes a selecting transistor 116A and the pixel 11B further includes a selecting transistor 116B.

The organic EL element 112 is a luminescence element having a cathode connected to a power source line 111, which is a second power source line, and an anode connected to a source 120 of the driving transistor 113. The organic EL element 112 generates photons according to a current flowing through the organic EL element 112.

The driving transistor 113 has a drain connected to a power source line 110, which is a first power source line, and a gate connected to the threshold voltage detecting unit 16. In response to application of a voltage corresponding to a signal voltage to the gate, the driving transistor 113 converts the signal voltage into a drain current corresponding to the voltage. The drain current is supplied to the organic EL element 112 as a driving current. The driving transistor 113 is implemented by an n-type thin film transistor (n-type TFT), for example.

A gate of each of the selecting transistors 116A and 116B is connected to the scanning line 130 and one of a source and a drain of each of the selecting transistors 116A and 116B is connected to the threshold voltage detecting unit 16. The other of the source and the drain of the selecting transistors 116A and 116B is connected to the first signal line 151 and the second signal line 152, respectively. The selecting transistors 116A and 116B function as a first selecting transistor and a second selecting transistor, respectively.

The threshold voltage detecting unit 16 is connected to the gate of the driving transistor 113 and the selecting transistor 116A or 116B and has the function of detecting a threshold voltage of the driving transistor 113.

It should be noted that preferably the threshold voltage detecting unit 16 has a storing capacitive element which stores voltages corresponding to a signal voltage and the reference voltage supplied from the first signal line 151 and the second signal line 152 through the selecting transistors 116A and 116B.

Figure 3A:
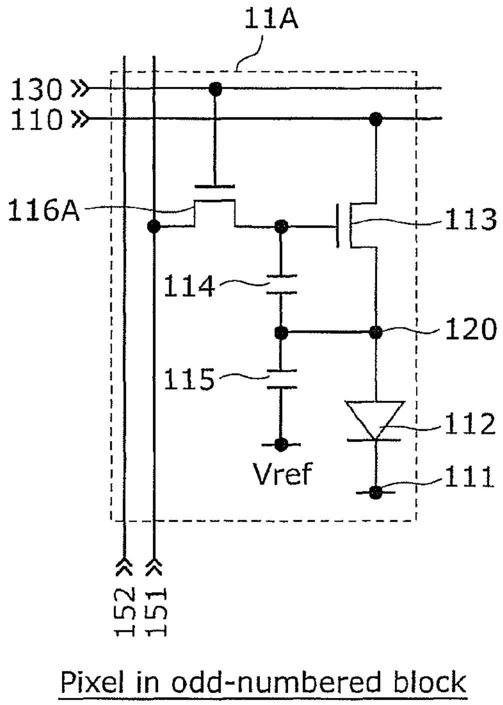
FIG. 3A is a circuit diagram specifically illustrating a pixel in an odd-numbered driving block in the image display device according to the first embodiment of the present invention.
Figure 3B:
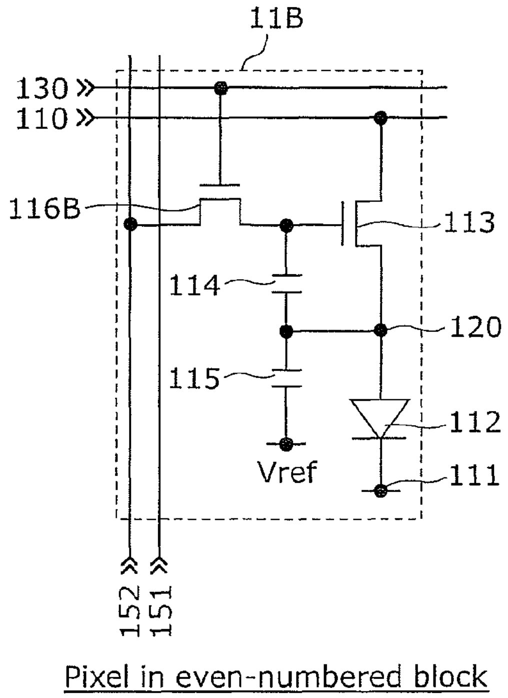
FIG. 3B is a circuit diagram specifically illustrating a pixel in an even-numbered driving block in the image display device according to the first embodiment of the present invention.

FIG. 3A is a circuit diagram specifically illustrating a luminescence element in an odd-numbered driving block in the image display device according to the first embodiment of the present invention. FIG. 3B is a circuit diagram specifically illustrating a luminescence element in an even-numbered driving block in the image display device according to the first embodiment of the present invention. Components of the threshold voltage detecting units 16 of the pixels are specifically illustrated in FIGS. 3A and 3B as compared with those of the pixels in FIGS. 2A and 2B. In the following description, repeated description of the components described with respect to FIGS. 2A and 2B will be omitted.

One terminal of each of the storing capacitive elements 114 is connected to the gate of the driving transistor 113 and the other terminal is connected to the source of the driving transistor 113. The storing capacitive element 114 has the function of storing an amount of charge corresponding to a signal voltage supplied from the first signal line 151 or the second signal line 152 and, after the selecting transistor 116A or 116B turns off, for example, controlling a driving current to be supplied from the driving transistor 113 to the organic EL element 112.

A storing capacitive element 115 is connected between the other terminal of the storing capacitive element 114 and a reference voltage source (which is denoted as reference voltage Vref in FIGS. 3A and 3B but may be a power source line 111). In a steady state, the storing capacitive element 115 first stores a source potential of the driving transistor 113 so that information on the source potential remains at a node between the storing capacitive elements 114 and 115 after a signal voltage is applied from the selecting transistor 116A or 116B. It should be noted that the source potential at this timing is the threshold voltage of the driving transistor 113. When subsequently the timing between the storing of the threshold voltage and photon generation varies among pixel rows, a gate voltage of the driving transistor 113 is fixed because the potential at the other terminal of the storing capacitive element 114 is fixed. On the other hand, a source potential of the driving transistor 113 is already in the steady state. Thus, the storing capacitive element 115 has the function of storing the source potential of the driving transistor 113.

It should be noted that the storing capacitive element 115 does not need to be added as an independent circuit element and may be a parasitic capacitance of the organic EL element 112.

The scanning line 130 is connected to the scanning/control line driving circuit 14 and has the function of providing the timing of storing a voltage corresponding to the signal voltage or the reference voltage in each pixel belonging to the pixel rows including the pixels 11A and 11B.

The first signal line 151 and the second signal line 152 are connected to the signal line driving circuit 15 and to each pixel belonging to the pixel columns including the pixels 11A and 11B, respectively, and have the function of supplying a reference voltage for detecting the threshold voltage of the driving transistor 113 and a signal voltage determining luminous intensity to the pixels.

The power source line 110 supplies a first voltage or a second voltage to the drain of the driving transistor 113. The first voltage is lower than the reference voltage supplied from the first signal line 151 and the second signal line 152. Application of the first voltage to the drain of the driving transistor 113 enables the source potential of the driving transistor 113 to be reset. The second voltage is higher than the reference voltage. Application of the second voltage to the drain of the driving transistor 113 enables the storing capacitive element 114 to store the voltage corresponding to the threshold voltage or enables the organic EL element 112 to generate photons with a driving current corresponding to a signal voltage. The control circuit 20 controls the timings of supplying the first voltage and the second voltage.

Although not depicted in FIGS. 3A and 3B, the power source line 111 and the reference voltage source are also connected to other pixels.

A method of driving the image display device 1 according to this embodiment will be described below with reference to FIG. 4. A method of driving the image display device which has the specific circuit configuration illustrated in FIGS. 3A and 3B will be described here in detail. It is assumed that each driving block is made up of m pixel rows.

Figure 4:
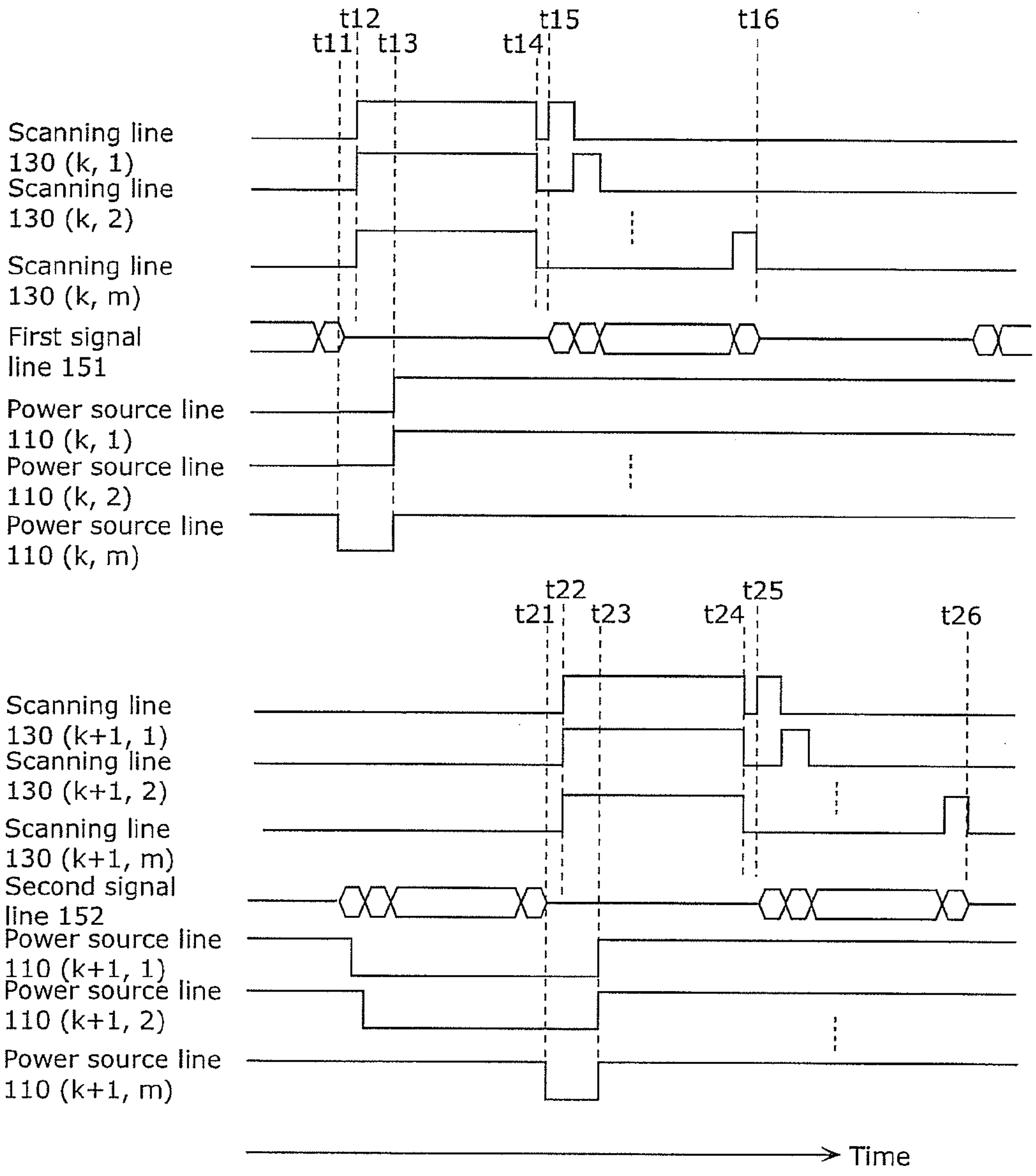
FIG. 4 is a timing chart of an operation of a method of driving the image display device according to the first embodiment of the present invention.
Figure 6:
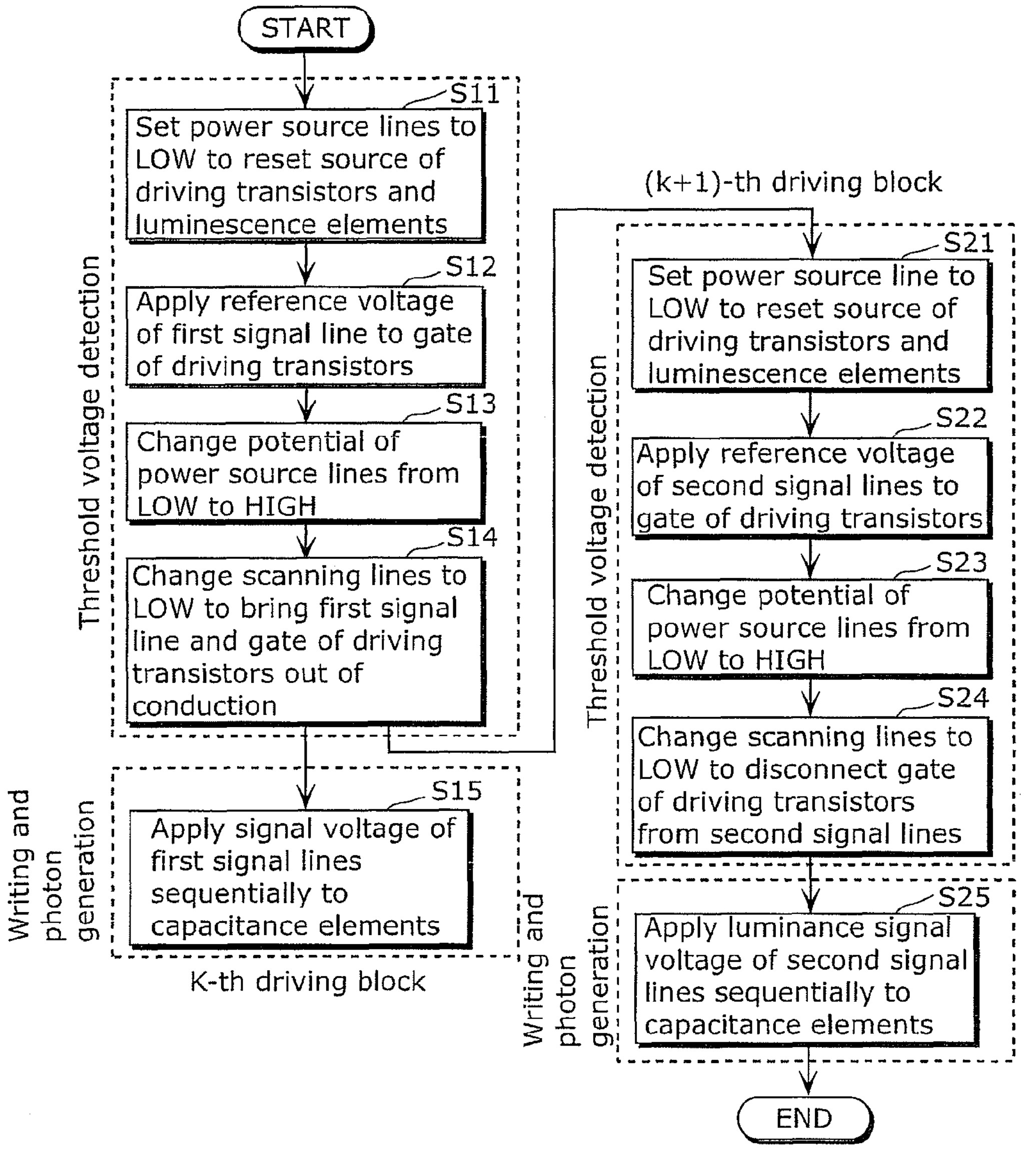
FIG. 6 is a flowchart of an operation of the image display device according to the first embodiment of the present invention.

FIG. 4 is a timing chart of an operation of the method of driving the image display device according to the first embodiment of the present invention. The horizontal axis of the chart represents time. Shown in FIG. 3 along the vertical direction are, in order from top, waveforms of voltages on a scanning line 130 (k, 1) disposed in the first row of the k-th driving block, a scanning line 130 (k, 2) disposed in the second row of the k-th driving block, a scanning line 130 (k, m) disposed in the m-th row of the k-th driving block, a first signal line 151, a power source line 110 (k, 1) disposed in the first row of the k-th driving block, a power source line 110 (k, 2) disposed in the second row of the k-th driving block, a power source line 110 (k, m) disposed in the m-th row of the k-th driving block. Following these waveforms are waveforms of voltages on a scanning line 130 (k+1, 1) disposed in the first row of the (k+1)-th driving block, a scanning line 130 (k+1, 2) disposed in the second row of the (k+1)-th driving block, a scanning line 130 (k+1, m) disposed in the m-th row of the (k+1)-th driving block, a second signal line 152, a power source line 110 (k+1, 1) disposed in the first row of the (k+1)-th driving block, a power source line 110 (k+1, 2) disposed in the second row of the (k+1)-th driving block, and a power source line 110 (k+1, m) disposed in the m-th row of the (k+1)-th driving block. FIG. 6 is a flowchart of an operation of the image display device according to the first embodiment of the present invention.

First, by time t11, the control circuit 20 sequentially sets a voltage level for the power source lines 110 (k, 1) to 110 (k, m) to LOW, which is a first voltage lower than a reference voltage, to reset the source potential of the driving transistors 113 (S11 of FIG. 6). Here, the first voltage is −10 V, for example, and the source potential of the driving transistors 113 is reset to −10 V.

Then, at time t12, the control circuit 20 changes the voltage level of the scanning lines 130 (k, 1) to 130 (k, m) from LOW to HIGH simultaneously to turn on the selecting transistors 116A (S12 of FIG. 6). By this time, the control circuit 20 has changed the voltage level of the first signal line 151 from the signal voltage to the reference voltage. Consequently, the reference voltage is applied to the gate of the driving transistors 113. Here, the reference voltage is 0 V, for example.

Then, at time t13, the control circuit 20 changes the voltage level of the power source lines 110 (k, 1) to 110 (k, m) from the first voltage to a second voltage, which is higher than the reference voltage (S13 of FIG. 6). Here, the second voltage is 10 V, for example. This operation completes the preparation for a threshold voltage detection stage.

In the period from time t13 to time t14, the circuit of the pixel 11A is in the steady state and a voltage equivalent to the threshold voltage Vth of the driving transistor 113 is stored in the storing capacitive element 114 by time t14. It should be noted that since current flowing to cause the storing capacitive element 114 to store the voltage equivalent to the threshold voltage Vth is small, it takes time for the circuit to be placed in a steady state. The longer the period, the more stable the voltage stored in the storing capacitive element 114 is. By providing a sufficiently long time for this period, accurate voltage compensation can be achieved.

Then, at time t14, the control circuit 20 changes the voltage level of the scanning lines 130 (k, 1) to 130 (k, m) from HIGH to LOW simultaneously to turn off the selecting transistors 116A (S14 of FIG. 6). This discontinues the application of the reference voltage to the driving transistors 113. At this time point, the voltage equivalent to the threshold voltage Vth of the driving transistors 113 is stored in the storing capacitive elements 114 of all pixels 11A in the k-th driving block simultaneously and the threshold voltage Vth of the driving transistors 113 to be compensated for is determined.

Thus, in the period from time t11 to time t14, correction of the threshold voltage Vth of the driving transistors 113 in the k-th driving block is performed simultaneously.

Then, at time t15, the control circuit 20 changes the voltage level of the first signal line 151 from the reference voltage to the signal voltage. Consequently, the signal voltage is applied to the gate of the driving transistors 113. Here, the signal voltage is in the range of 0 V to 5 V, for example.

In the period from time t15 to time t16, the control circuit 20 changes the voltage level of the scanning lines 130 (k, 1) to 130 (k, m) from LOW to HIGH to LOW in sequence to turn on the selecting transistors 116A sequentially from one row of pixels to another (S15 of FIG. 6). Consequently, the signal voltage is applied to the gate of the driving transistors 113. At this time point, a sum voltage equal to the sum of a voltage corresponding to the signal voltage and the voltage equivalent to the threshold voltage Vth of each driving transistor 113 that has been previously stored is stored in the storing capacitive element 114. At the same time, a driving current from the driving transistors 113 flows into the organic EL elements 112 to cause the organic EL elements 112 to generate photons in the order of pixel rows.

Thus, in the period from time t15 and t16, storing of the signal voltage corrected with high accuracy and photon generation are performed in the k-th driving block in the order of pixel rows.

After time t16, the control circuit 20 changes the voltage level of the power source lines 110 (k, 1) to 110 (k, m) from the second voltage to the first voltage in the order of pixel rows to optically quench the pixels in the order of pixel rows.

By grouping the pixel rows into driving blocks in this way, detection of the threshold voltage of the driving transistors 113 in a driving block can be performed in the same period. Accordingly, up to 1 frame period divided by the number of the driving blocks can be allocated for a threshold voltage detection period. Consequently, a driving current corrected with high accuracy flows into the organic EL elements 112 and the image display quality can be improved. Furthermore, the control circuit 20 can perform the control in the same block simultaneously, that is, the control circuit 20 can output the same control signal to the same driving block and therefore the number of outputs from the control circuit 20 an be reduced.

The method of driving the image display device 1 according to this embodiment will be continued.

On the other hand, an operation for correcting the threshold voltage of the driving transistors 113 in the (k+1)-th driving block is started at time t21 immediately after time t14.

First, at time t21, the control circuit 20 forces the voltage level of the power source lines 110 (k+1, 1) to 110 (k+1, m) to LOW, which is a first voltage lower than the reference voltage, to reset the source potential of the driving transistor 113 (S21 of FIG. 6). Here, the first voltage is −10 V, for example, and the source potential of the driving transistor 113 is reset to −10 V.

Then, at time t22, the control circuit 20 changes the voltage level of the scanning lines 130 (k+1, 1) to 130 (k+1, m) from LOW to HIGH simultaneously to turn on the selecting transistors 116B (S22 of FIG. 6). By this time, the control circuit 20 has been changed the voltage level of the second signal line 152 from the signal voltage to the reference voltage. Consequently, the reference voltage is applied to the gate of the driving transistor 13. Here, the reference voltage is 0 V, for example.

Then, at time t23, the control circuit 20 changes the voltage level of the power source lines 110 (k+1, 1) to 110 (K+1, m) from the first voltage to a second voltage higher than the reference voltage (S23 of FIG. 6). Here, the second voltage is 10 V, for example. This completes preparation for the stage of threshold voltage detection.

In the period from time t23 to time t24, the circuit of the pixel 11B is in the steady state and a voltage equivalent to the threshold voltage Vth of the driving transistor 113 is stored in the storing capacitive element 114. It should be noted that since current flowing to cause the storing capacitive element 114 to store the voltage equivalent to the threshold voltage Vth is small, it takes time for the circuit to be placed in a steady state. The longer the period, the more stable the voltage stored in the storing capacitive element 114 is. By providing a sufficiently long time for this period, accurate voltage compensation can be achieved.

Then, at time t24, the control circuit 20 changes the voltage level of the scanning lines 130 (k+1, 1) to 130 (k+1, m) from HIGH to LOW simultaneously to turn off the selecting transistors 116B (S24 of FIG. 6). This discontinues the application of the reference voltage to the driving transistors 113. At this time point, the voltage equivalent to the threshold voltage Vth of the driving transistor 113 is stored in the storing capacitive elements 114 of all pixels 11B in the (k+1)-th driving block simultaneously and the threshold voltage Vth of the driving transistors 113 to be compensated for is determined.

In the period from t21 to time t24, correction of the threshold voltage Vth of the driving transistors 113 in the (k+1)-th driving block is performed simultaneously.

Then, at time t25, the control circuit 20 changes the voltage level of the second signal line 152 from the reference voltage to the signal voltage. Consequently, the signal voltage is applied to the gate of the driving transistor 113. Here, the signal voltage is in the range of 0 V to 5 V, for example.

In the period from time t25 to time t26, the control circuit 20 changes the voltage level of the scanning lines 130 (k+1, 1) to 130 (k+1, m) from LOW to HIGH to LOW in sequence to turn on the selecting transistors 116B sequentially from one row of pixels to another (S25 of FIG. 6). Consequently, the signal voltage is applied to the gate of the driving transistors 113. At this time point, a sum voltage equal to the sum of a voltage corresponding to the signal voltage and the voltage equivalent to the threshold voltage Vth of each driving transistor 113 that has been previously stored is stored in the storing capacitive element 114. At the same time, a driving current from the driving transistors 113 flows into the organic EL elements 112 to cause the organic EL elements 112 to generate photons in the order of pixel rows.

In this way, storing of the signal voltage corrected with high accuracy and photon generation are performed in the (k+1)-th driving block in the order of pixel rows in the period from time t25 and t26.

The operation described above is sequentially performed on the (k+2)-th block and the subsequent blocks in the display panel 10.

Figure 5:
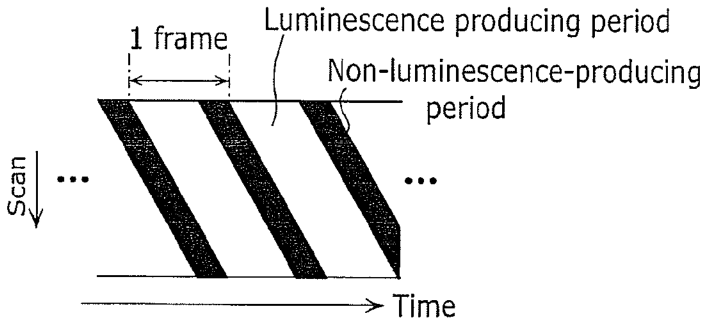
FIG. 5 is a state transition diagram of a driving block which is generating photons by the driving method according to the first embodiment of the present invention.

FIG. 5 is a state transition diagram of driving blocks which are generating photons by the driving method according to the first embodiment of the present invention. Shown in FIG. 5 are a luminescence producing period and a non-luminescence-producing period of each driving block in a pixel column. The vertical direction represents driving blocks and the horizontal axis represents elapsed time. Here, the non-luminescence-producing period includes a threshold voltage correction period including the preparation period described above, and a signal voltage storing period.

According to the method of driving the image display device according to the first embodiment of the present invention, luminescence producing periods are set in the order of the pixel rows in the same driving block. Accordingly, luminescence producing periods continuously appear in the driving block in a row scanning direction.

In this way, pixel circuits in each of which a driving transistor 113, a selecting transistor 116A or 116B, and a storing capacitive element 114 are disposed and which are grouped into driving blocks, and two signal lines disposed in each pixel column enable a large part of 1 frame period Tf during which the signal voltage to all pixels are refreshed to be allocated to a threshold voltage correction period for driving transistors 113. This is because a threshold voltage correction period for the (k+1)-th driving block during is provided in a period during which a luminance signal is being sampled in the k-th driving block. Thus, the threshold voltage correction period is divided among the driving blocks, rather than being divided among the pixel rows. Accordingly, as the display area increases, the longer threshold voltage correction period can be set relative to 1 frame period. Consequently, a driving current based on a luminance signal voltage corrected with high accuracy flows into the luminescence elements, improving the image display quality. Furthermore, since correction of the threshold voltage of the driving transistors 113 in the same driving block can be performed in the same period and timing, output loads on the control circuit 20, scanning/control line driving circuit 14, and the signal line driving circuit 15 are reduced.

For example, if a display panel 10 having M pixel rows is divided into N driving blocks, a threshold correction period of Tf/N at the maximum can be provided for each pixel.

In contrast, if threshold voltage correction periods are set at different timings for M different pixel (M>>N), a threshold voltage correction period of Tf/M at the maximum can be provided for each pixel. If a two signal lines are disposed in each pixel column as described in Japanese Unexamined Patent Application Publication No. 2008-122633, a threshold voltage correction period of 2Tf/M at the maximum can be provided.

Second Embodiment

A second embodiment of the present invention will be described below with reference to drawings.

Figure 7:
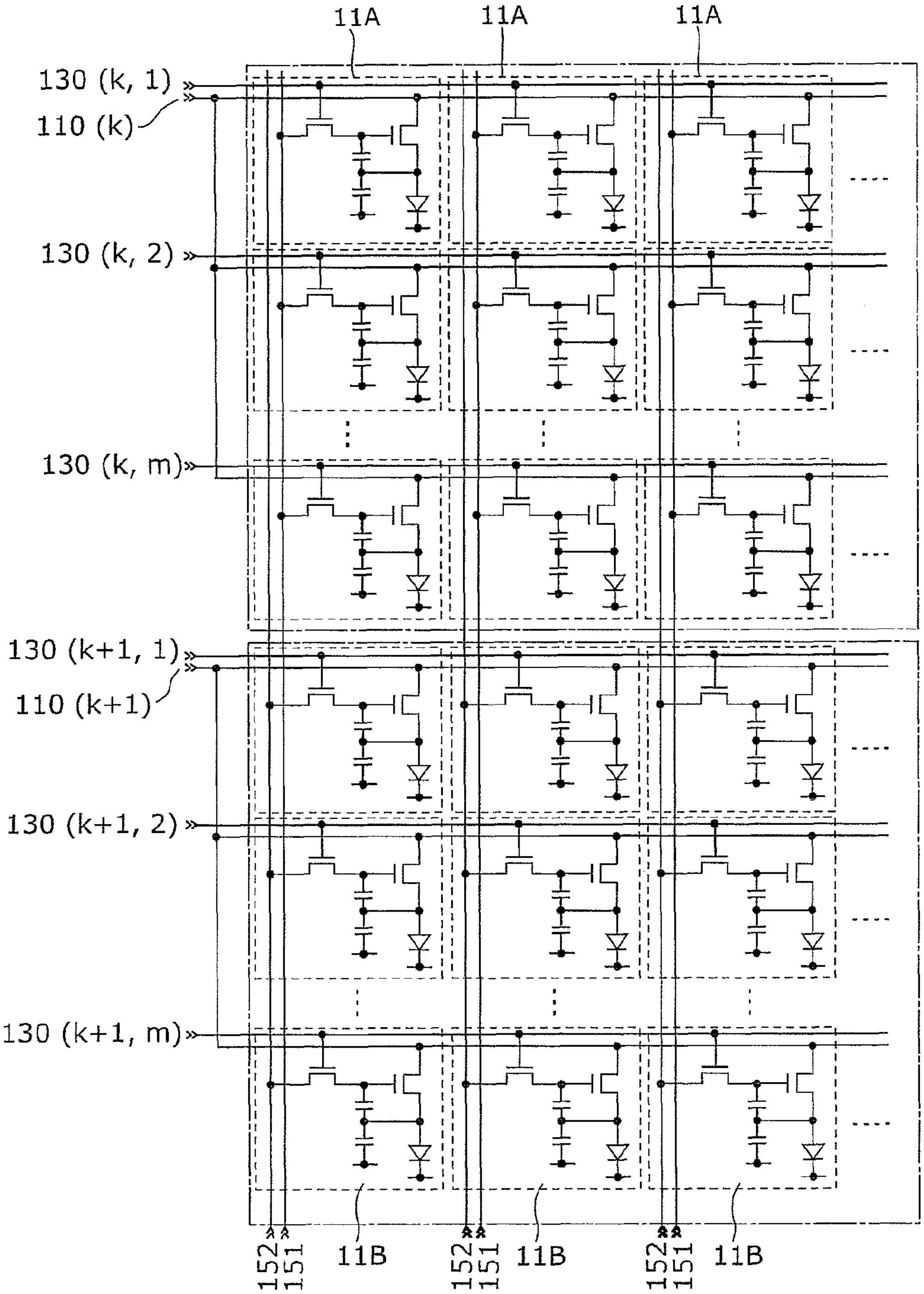
FIG. 7 is a circuit diagram illustrating a portion of a display panel of an image display device according to a second embodiment of the present invention.

FIG. 7 is a circuit diagram illustrating a portion of a display panel of an image display device according to the second embodiment of the present invention. Two adjacent driving blocks, scanning liens, and signal lines are depicted in FIG. 7. In FIG. 7, the scanning lines and the signal lines are denoted by “reference numeral (block number, row number in the block) or “reference numeral (block number)”.

As described earlier, a driving block is made up of a plurality of pixel rows and two or more driving blocks exist in the display panel 10. For example, each driving block depicted in FIG. 7 is made up of m pixel rows.

In the k-th driving block depicted in the upper part of FIG. 7, a power source line 110 (k) is connected to drains of driving transistors 113 of all pixels 11A in common. On the other hand, scanning lines 130 (k, 1) to 130 (k, m) are connected individually with pixel rows. Connections similar to those in the k-th driving block are made in the (k+1)-th driving block depicted in the lower part of FIG. 7. However, the power source line 110 (k) connected to the k-th driving block and the power source line 110 (k+1) connected to the (k+1)-th driving block are control lines different from each other and power source voltages are individually outputted from a scanning/control line driving circuit 14.

In the k-th driving block, a first signal line is connected to one of the source and drain of a selecting transistor 116A of each of all pixels 11A. On the other hand, in the (k+1)-th driving block, a second signal line 152 is connected to one of the source and drain of a selecting transistor 116B of each of all pixels 11B.

The image display device according to the second embodiment differs from the image display device according to the first embodiment only in that a signal voltage applied from a signal line to the gate of a driving transistor 113 is used to optically quench a pixel in the image display device according to the second embodiment, rather than changing the voltage of a power source line 110 from the second voltage to the first voltage.

Grouping the pixel rows into driving blocks as described above reduces the number of power source lines 110 for applying a power source voltage to the drains of the driving transistors 113. Accordingly, the number of outputs of the scanning/control line driving circuit 14 that output a variable voltage onto the power source lines 110 and therefore the circuit size can be reduced.

In the conventional image display device 500 described in Japanese Unexamined Patent Application Publication No. 2008-122633, for example, a power source line is disposed in each pixel rows. If the image display device 500 includes M pixel rows, M power supply lines in total are provided.

In the image display device according to the second embodiment of the present invention, in contrast, a power source line is provided for each driving block from the scanning/control line driving circuit 14. Accordingly, if the image display device includes N driving blocks, N power source lines in total are provided.

As the display area increases and accordingly includes a larger number of pixel rows, M becomes much greater than N (M>>N). In that case, the number of power source lines of an image display device can be significantly reduced according to the present invention as compared with the conventional image display device.

A method of driving the image display device according to the second embodiment will be described below with reference to FIG. 8.

Figure 8:
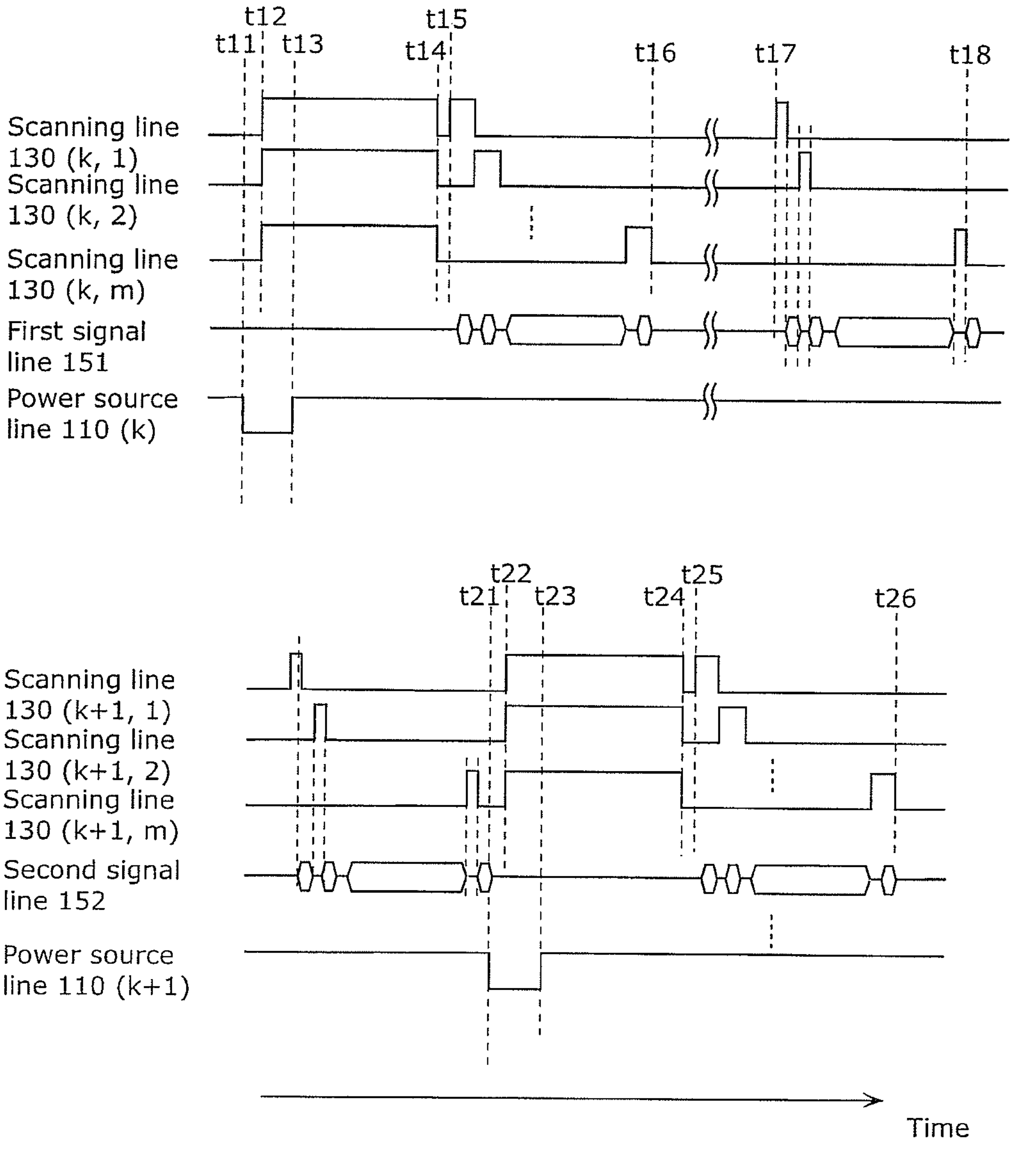
FIG. 8 is a timing chart of an operation of a method of driving the image display device according to the second embodiment of the present invention.

FIG. 8 is a timing chart of an operation of a method of driving the image display device according to the second embodiment of the present invention. The horizontal axis of the chart represents time. Shown in FIG. 8 in rows are, in order from top, waveforms of voltages on a scanning line 130 (k, 1) disposed in the first row of the k-th driving block, a scanning line 130 (k, 2) disposed in the second row of the k-th driving block, a scanning line 130 (k, m) disposed in the m-th row of the k-th driving block, the first signal line 151, and a power source line 110 (k) disposed in common in the first row of the k-th driving block. Following these waveforms are waveforms on a scanning line 130 (k+1, 1) disposed in the first row of the (k+1)-th driving block, a scanning line 130 (k+1, 2) disposed in the second row of the (k+1)-th driving block, a scanning line 130 (k+1, m) disposed in the m-th row of the (k+1)-th driving block, a second signal line 152, and a power source line 110 (k+1) disposed in common in the (k+1)-th block. FIG. 6 is a flowchart of an operation of the image display device according to the second embodiment of the present invention.

The driving method according to the second embodiment differs from the driving method according to the first embodiment illustrated in FIG. 4 only in that organic EL elements 112 are optically quenched by using a signal voltage applied from signal lines to the gates of the driving transistors 113, rather than changing the voltage of the power source lines 110 from the second voltage to the first voltage. Along with this, the power source lines 110 disposed in the same driving block are connected in common in the driving block, therefore the power source voltage in the same driving block is driven at the same driving timing in all periods.

First, at time t11, the control circuit 20 sets the voltage level of the power source line 110 (k) to LOW, which is a first voltage lower than a reference voltage, to reset the source potential of the driving transistors 113 (S11 of FIG. 6). Here, the first voltage is −10 V, for example, and the source potential of the driving transistors 113 is reset to −10 V.

Then, at time t12, the control circuit 20 changes the voltage level of the scanning lines 130 (k, 1) to 130 (k, m) from LOW to HIGH simultaneously to turn on the selecting transistors 116A (S12 of FIG. 6). By this point in time, the control circuit 20 has changed the voltage level of the first signal lines 151 from a signal voltage to the reference voltage. Consequently, the reference voltage is applied to the gate of the driving transistors 113. Here, the reference voltage is 0 V, for example.

Then, at time t13, the control circuit 20 changes the voltage level of the power source line 110 (k) from the first voltage to a second voltage, which is higher than the reference voltage (S13 of FIG. 6). Here, the second voltage is 10 V, for example. This operation completes the preparation for a threshold voltage detection stage.

In the period from time t13 to time t14, the circuit of the pixel 11A is placed in the steady state by time t14 and a voltage equivalent to the threshold voltage Vth of the driving transistor 113 is stored in the storing capacitive element 114. It should be noted that since current flowing to cause the storing capacitive element 114 to store the voltage equivalent to the threshold voltage Vth is small, it takes time for the circuit to be placed in the steady state. The longer the time, the more stable the voltage stored in the storing capacitive element 114 is. By providing a sufficiently long time for this period, accurate voltage compensation can be achieved.

Then, at time t14, the control circuit 20 changes the voltage level of the scanning lines 130 (k, 1) to 130 (k, m) from HIGH to LOW simultaneously to turn off the selecting transistors 116A (S14 of FIG. 6). This discontinues the application of the reference voltage to the driving transistor 113. At this time point, a detected voltage is stored in the storing capacitive elements 114 and 115 of all pixels 11A in the k-th driving block as a voltage equivalent to the threshold voltage Vth of the driving transistors 113.

Thus, in the period from time t11 to time t14, detection of the threshold voltage Vth of the driving transistors 113 in the k-th driving block is performed simultaneously.

Then, at time t15, the control circuit 20 changes the voltage level of the first signal lines 151 from the reference voltage to a signal voltage. Consequently, the signal voltage is applied to the gate of the driving transistors 113. Here, a period during which a zero voltage is supplied is provided in the signal voltage supplying period. The period during which the zero voltage is supplied is provided with a duty ratio of 50% of the period during which the signal voltage is supplied. Here, the signal voltage is in the range of 0 V to 5 V, for example, whereas the signal voltage in the zero-voltage supplying period is 0 V.

In the period from time t15 to time t16, the control circuit 20 changes the voltage level of the scanning lines 130 (k, 1) to 130 (k, m) from LOW to HIGH to LOW in sequence to turn on the selecting transistors 116A sequentially from one row of pixels to another (S15 of FIG. 6). Consequently, the signal voltage is applied to the gate of the driving transistors 113. At this time point, a sum voltage equal to the sum of a voltage corresponding to the signal voltage and the voltage equivalent to the threshold voltage Vth of each driving transistor 113 that has been previously stored is stored in the storing capacitive element 114. At the same time, a driving current from the driving transistors 113 flows into the organic EL elements 112 to cause the organic EL elements 112 to generate photons in the order of pixel rows.

Thus, in the period from time t15 and t16, storing of the signal voltage corrected with high accuracy and photon generation are performed in the k-th driving block in the order of pixel rows.

Then, in the period from time t17 to time t18, the control circuit 20 changes the voltage level of the scanning lines 130 (k, 1) to 130 (k, m) from LOW to HIGH to LOW in sequence to sequentially turn on the selecting transistors 116A from one row of pixels to another. Here, the period during which the voltage level of the scanning lines 130 (k, 1) to 130 (k, m) is forced HIGH is aligned with the period during which the signal voltage supplied from the first signal line 151 to the gate of the driving transistors 113 is a zero voltage. Consequently, the driving transistors 113 in the k-th driving block stops supplying a driving current in the order of pixel rows and the organic EL elements 112 cease generating photons in the order of pixel rows.

In the second embodiment, by grouping the pixel rows into driving blocks as in the first embodiment, detection of the threshold voltage of the driving transistors 113 in a driving block can be performed in the same period. Accordingly, up to 1 frame period divided by the number of the driving blocks can be allocated for a threshold voltage detection period. Consequently, a driving current corrected with high accuracy flows into the organic EL elements 112 and the image display quality can be improved. Furthermore, since the power source lines can be connected in common in the same driving block, the output load on the control circuit 20 is reduced.

The method of driving the image display device 1 according to this embodiment will be continued.

On the other hand, an operation for correcting the threshold voltage of the driving transistors 113 in the (k+1)-th driving block is started at time t21 immediately after time t24.

First, at time t21, the control circuit 20 forces the voltage level of the power source line 110 (k+1) to LOW, which is the first voltage lower than the reference voltage, to reset the source potential of the driving transistors 113 (S21 of FIG. 6). Here, the first voltage is −10 V, for example, and the source potential of the driving transistors 113 is reset to −10 V.

Then, at time t22, the control circuit 20 changes the voltage level of the scanning lines 130 (k+1, 1) to 130 (k+1, m) from LOW to HIGH to turn on the selecting transistors 116A (S22 of FIG. 6). By this time point, the control circuit 20 has changed the voltage level of the second signal lines 152 from the signal voltage to the reference voltage. Consequently, the reference voltage is applied to the gate of the driving transistors 113. Here, the reference voltage is 0 V, for example.

Then, at time t23, the control circuit 20 changes the voltage level of the power source line 110 (k+1) from the first voltage to a second voltage, which is higher than the reference voltage (S23 of FIG. 6). Here, the second voltage is 10 V, for example. This operation completes the preparation for a threshold voltage detection stage.

In the period from time t23 to t24, the circuit of the pixel 11A is placed in the steady state and a voltage equivalent to the threshold voltage Vth of the driving transistor 113 is stored in the storing capacitive element 114. It should be noted that since current flowing to cause the storing capacitive element 114 to store the voltage equivalent to the threshold voltage Vth is small, it takes time for the circuit to be placed in the steady state. The longer the time, the more stable the voltage stored in the storing capacitive element 114 is. By providing a sufficiently long time for this period, accurate voltage compensation can be achieved.

Then, at time t24, the control circuit 20 changes the voltage level of the scanning lines 130 (k+1, 1) to 130 (k+1, m) from HIGH to LOW simultaneously to turn off the selecting transistors 116B (S24 of FIG. 6). This discontinues the application of the reference voltage to the driving transistors 113. At this time point, the voltage equivalent to the threshold voltage Vth of the driving transistor 113 is stored in the storing capacitive elements 114 of all pixels 11B in the (k+1)-th driving block simultaneously.

In the period from t21 to time t24, correction of the threshold voltage Vth of the driving transistors 113 in the (k+1)-th driving block is performed simultaneously.

Then, at time t25, the control circuit 20 changes the voltage level of the second signal lines 152 from the reference voltage to a signal voltage. Consequently, the signal voltage is applied to the gate of the driving transistors 113. Here, a period during which a zero voltage is supplied is provided in the signal voltage supplying period. The period during which the zero voltage is supplied is provided with a duty ratio of 50% of the period during which the signal voltage is supplied. Here, the signal voltage is in the range of 0 V to 5 V, for example, whereas the signal voltage in the zero-voltage supplying period is 0 V.

In the period from time t25 to time t26, the control circuit 20 changes the voltage level of the scanning lines 130 (k+1, 1) to 130 (k+1, m) from LOW to HIGH to LOW in sequence to turn on the selecting transistors 116B sequentially from one row of pixels to another (S25 of FIG. 6). Consequently, the signal voltage is applied to the gate of the driving transistors 113. At this time point, a sum voltage equal to the sum of a voltage corresponding to the signal voltage and the voltage equivalent to the threshold voltage Vth of each driving transistor 113 that has been previously stored is stored in the storing capacitive element 114. At the same time, a driving current from the driving transistors 113 flows into the organic EL elements 112 to cause the organic EL elements 112 to generate photons in the order of pixel rows.

Thus, in the period from time t25 and t26, storing of the signal voltage corrected with high accuracy and photon generation are performed in the (k+1)-th driving block in the order of pixel rows.

Then, in the period after time t26, the control circuit 20 changes the voltage level of the scanning lines 130 (k+1, 1) to 130 (k+1, m) from LOW to HIGH to LOW in sequence to sequentially turn on the selecting transistors 116B from one row of pixels to another. Here, the period during which the voltage level of the scanning lines 130 (k+1, 1) to 130 (k+1, m) is forced HIGH is aligned with the period during which the signal voltage supplied from the second signal line 152 to the gate of the driving transistors 113 is a zero voltage. Consequently, the driving transistors 113 in the (k+1)-th driving block stops supplying a driving current in the order of pixel rows and the organic EL elements 112 cease generating photons in the order of pixel rows.

In the method of driving the image display device according to the second embodiment of the present invention, as in the first embodiment, luminescence producing periods are set in the order of the pixel rows in the same driving block. Accordingly, luminescence producing periods continuously appear in the driving block in a row scanning direction.

According to the second embodiment of the present invention, a large part of 1 frame period Tf during which the signal voltage to all pixels are refreshed can be allocated to a threshold voltage correction period for driving transistors 113. Consequently, a driving current based on a luminance signal voltage corrected with high accuracy flows into the luminescence elements, improving the image display quality. Furthermore, since correction of the threshold voltage of the driving transistors 113 in the same driving block can be performed in the same period and timing, output loads on the control circuit 20, scanning/control line driving circuit 14, and the signal line driving circuit 15 is reduced.

In a method in which a driving current of driving transistors 113 is controlled by a variable power source voltage as in the image display device driving method according to the first embodiment, power source lines 110 in the same driving block are driven at the same time in a threshold voltage correction period. However, storing of a signal voltage in the storing capacitive elements 114 and luminance production are performed in the order of pixel rows and accordingly the power source lines 110 need to be driven in the order of the pixel rows during optical quenching.

In the image display device driving method according to the second embodiment, in contrast, a period during which a zero voltage is supplied can be provided for a signal voltage supplied from the signal line to each pixel row, and the selecting transistors can be brought into conduction during the zero-voltage period to write the zero voltage in the gate of the driving transistors 113 to optically quench the pixel row simultaneously. According to this method, the power source lines 110 in the same driving block do not need to be individually driven during optical quenching as well a threshold voltage detection period. Therefore, power source lines 110 disposed in the same driving block can be connected in common and the number of output lines from the control unit can be reduced.

In the second embodiment as in the first embodiment, if a display panel 10 having M pixel rows is divided into N driving blocks, for example, a threshold correction period of Tf/N at the maximum can be provided for each pixel. Furthermore, N power source lines 110 are provided from the scanning/control line driving circuit 14.

In contrast, in a conventional method in which threshold voltage correction periods are set at different timings for different pixel rows, if threshold voltage correction periods are set at different timings for M different pixels (M>>N), a threshold voltage correction period of Tf/M at the maximum can be provided for each pixel. If a two signal lines are disposed in each pixel column as described in Japanese Unexamined Patent Application Publication No. 2008-122633, a threshold voltage correction period of 2Tf/M at the maximum can be provided. Furthermore, M power supply lines are provided.

Image display devices according to the present invention are not limited to the embodiments described above. The present invention also includes other embodiments implemented by combining any components of the first and second embodiments, variations implemented by making modifications to any of the first and second embodiments that may be conceived by those skilled in the art without departing from the essence of the present invention, and various apparatuses incorporating an image display device according to the present invention.

While selecting transistors in the embodiments described above have been described as n-type transistors which turn on when the gate voltage level is high, the same effects as those of any of the embodiments described above can be achieved by an image display device in which the transistors are implemented by p-type transistors and the polarity of the scanning lines are reversed.

Figure 9:
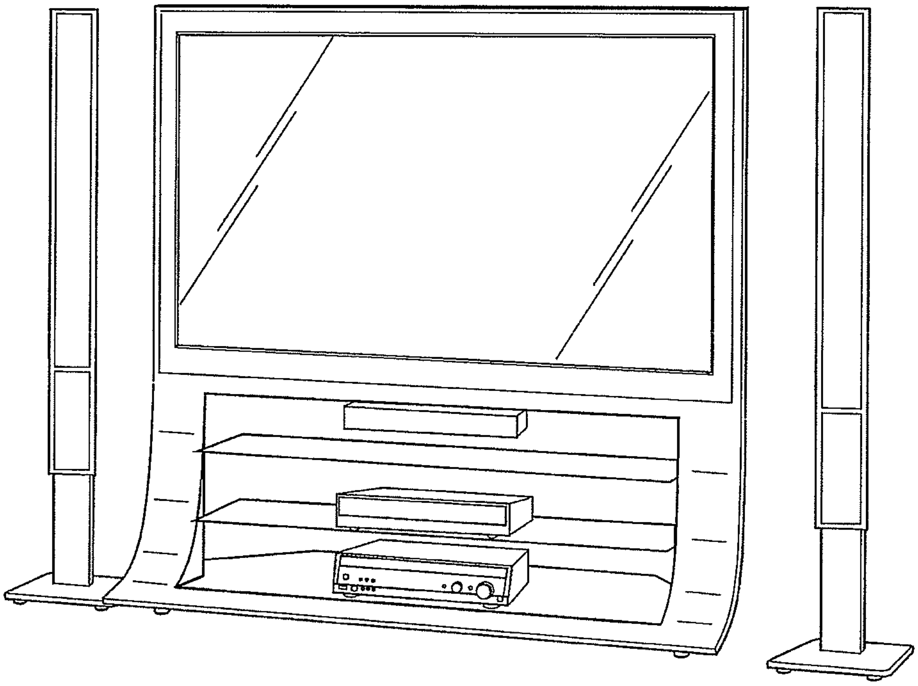
FIG. 9 is an external view of a thin flat TV incorporating an image display device of the present invention.
Figure 10:
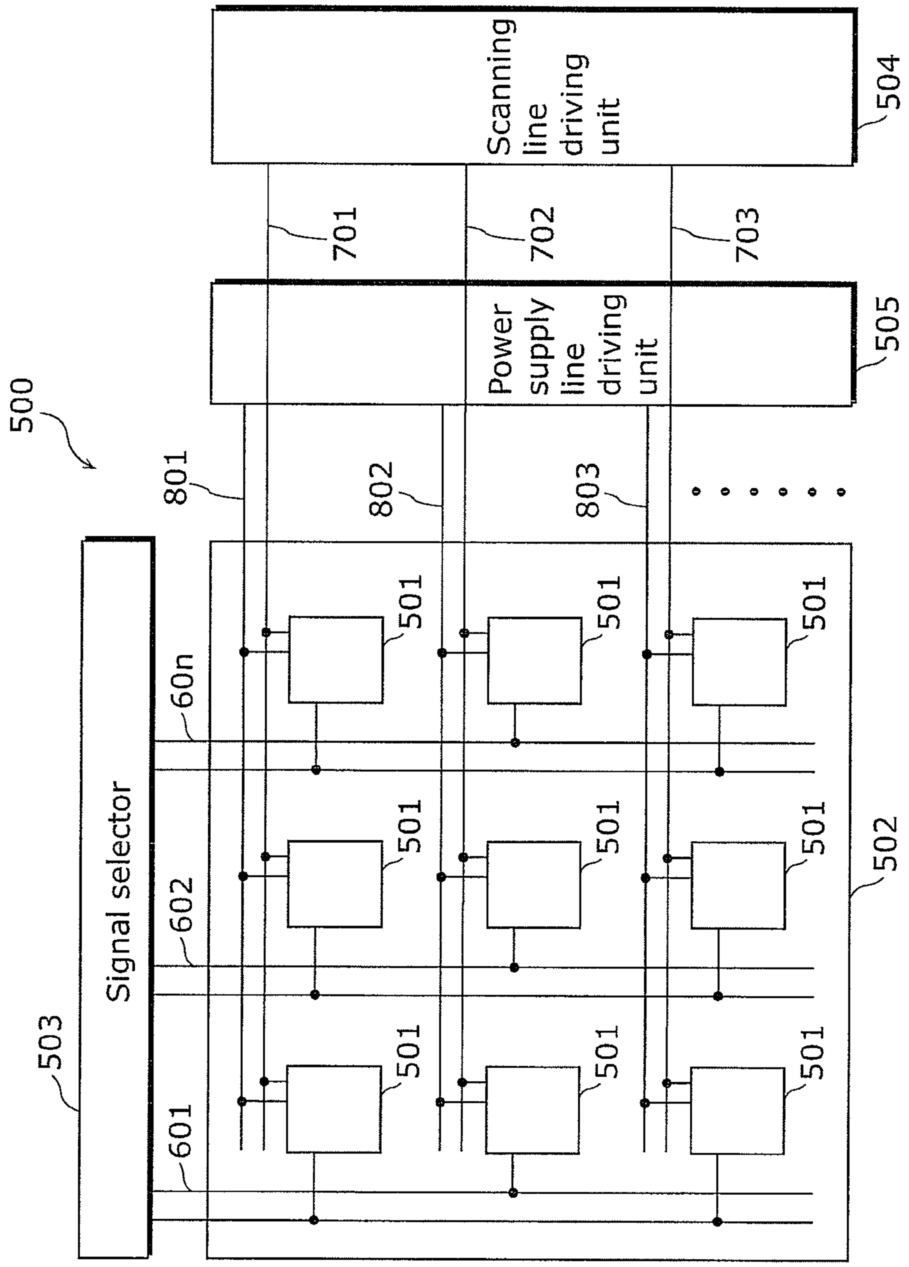
FIG. 10 is a block diagram illustrating a configuration of a conventional image display device described in Japanese Unexamined Patent Application Publication No. 2008-122633.
Figure 11:
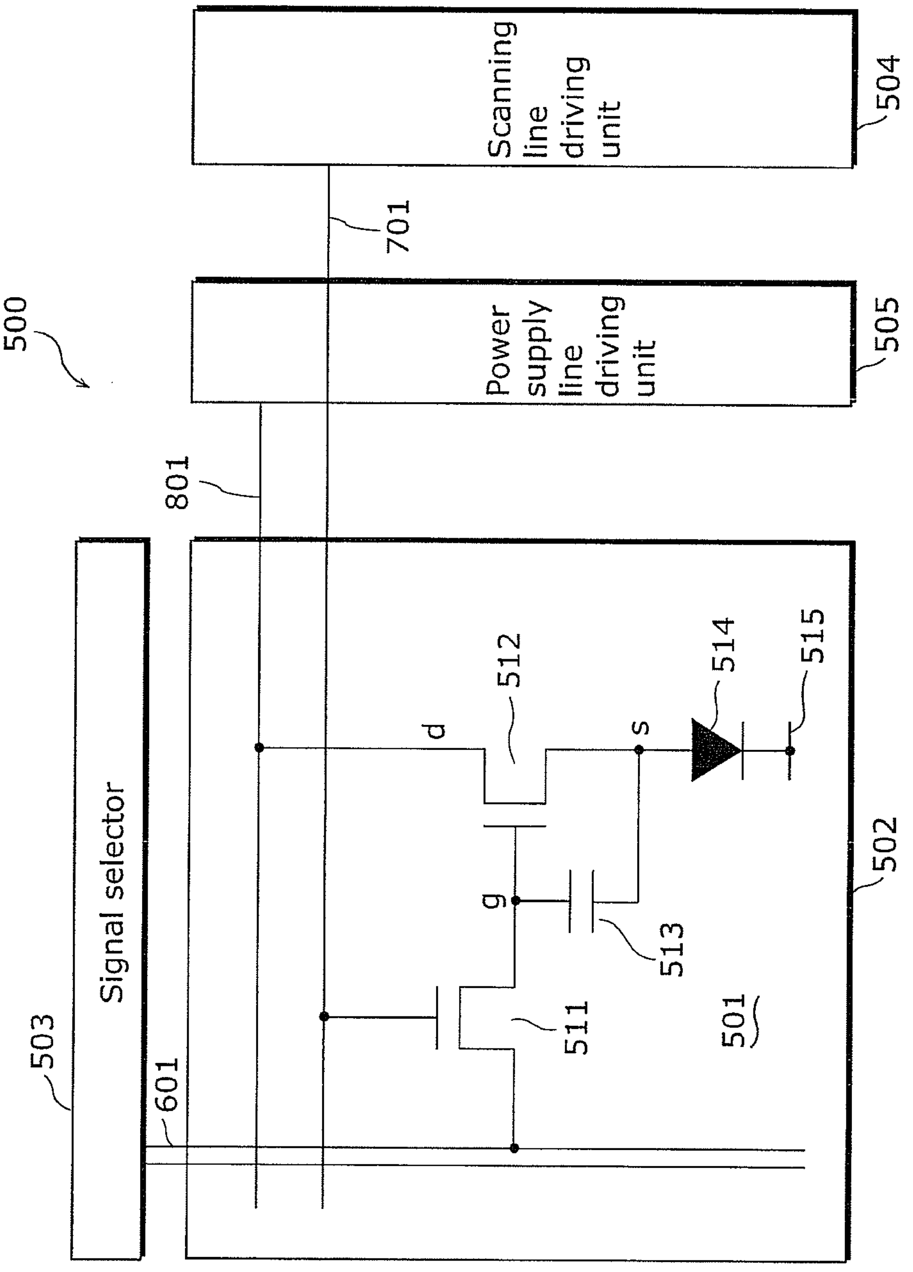
FIG. 11 is a circuit diagram of a pixel of the conventional image display device described in Japanese Unexamined Patent Application Publication No. 2008-122633.
Figure 12:
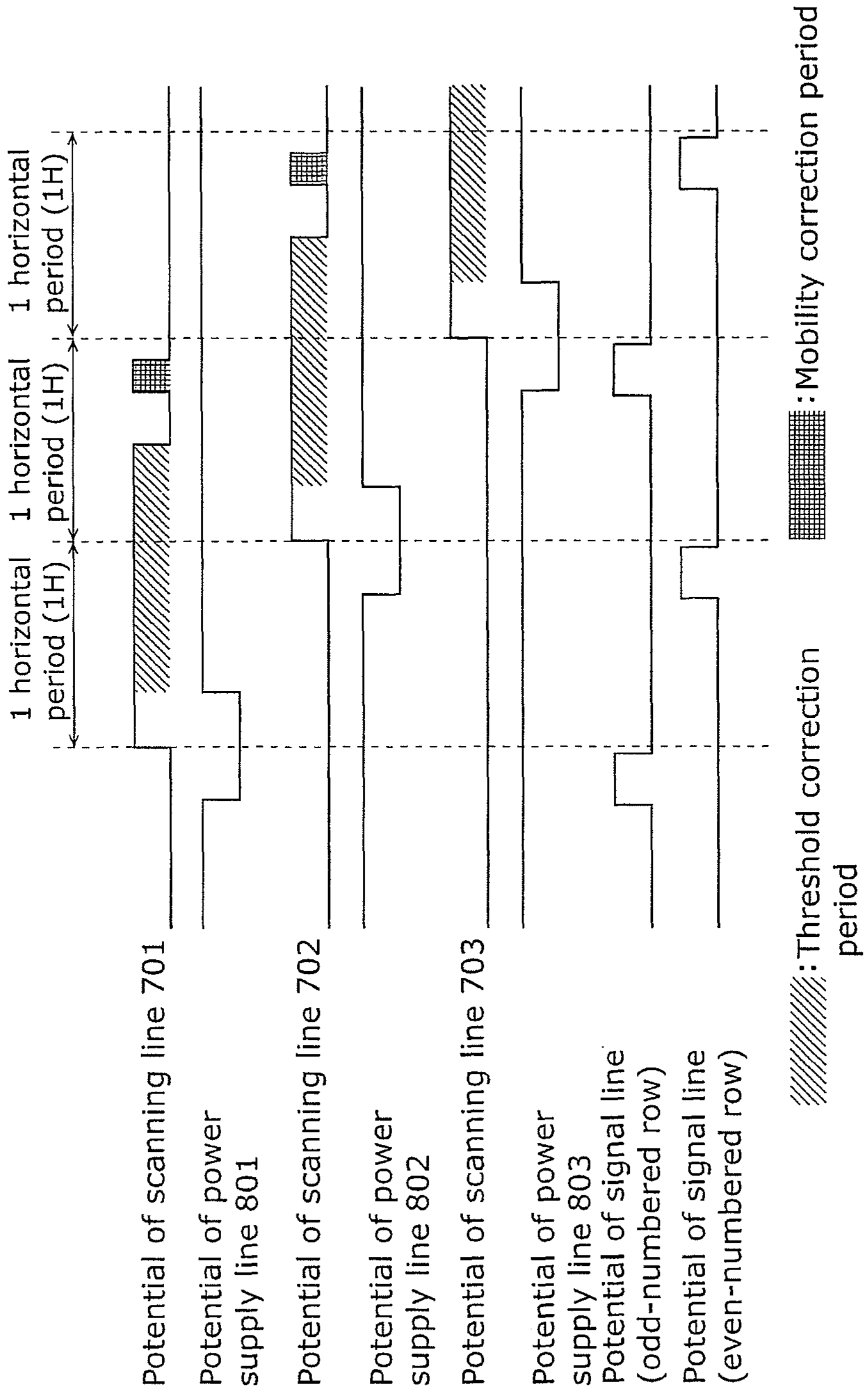
FIG. 12 is a timing chart of an operation of the image display device described in Japanese Unexamined Patent Application Publication No. 2008-122633.

An image display device according to the present invention may be incorporated in a thin flat TV as the one illustrated in FIG. 9, for example. Incorporation of the image display device according to the present invention enables implementation of a thin flat TV capable of displaying high-resolution images which reflect video signals.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

Image display devices and methods for driving the image display devices according to the present invention is particularly useful as active organic EL flat panel displays that changes the luminance of pixels by using a pixel signal current to control the luminous intensity of pixels and as methods for driving such displays.

What is claimed is:

1. An image display device including a plurality of pixels arranged in rows and columns, the image display device comprising:

a scanning line disposed in each of the rows;

a first power source line which is disposed in each of the rows and supplies a first voltage lower than a reference voltage and a second voltage higher than the reference voltage; and a second power source line, wherein each of the pixels includes:

a driving transistor which converts a signal voltage which determines luminous intensity into a driving current according to the signal voltage applied to a gate of the driving transistor;

a luminescence element which includes a terminal connected to the second power source line and another terminal connected to one of a source and a drain of the driving transistor, and generates photons in response to the driving current flowing through the luminescence element; and a threshold voltage detecting unit which includes a storing capacitive element and is configured to detect a threshold voltage of the driving transistor while the reference voltage is applied to the gate of the driving transistor, the storing capacitive element having a terminal connected to the gate of the driving transistor and another terminal connected to the one of the source and the drain of the driving transistor, and storing at least a voltage corresponding to the signal voltage or the reference voltage, the other of the source and the drain of the driving transistor is connected to the first power source line, the pixels make up at least two or more driving blocks, each of the driving blocks including plural pixel rows, the signal voltage and the reference voltage are applied to the gate of the driving transistor of a pixel in a k-th one of the driving blocks through a first signal line disposed in each of the columns, where k is a positive integer, the signal voltage and the reference voltage are applied to the gate of the driving transistor of a pixel in a (k+1)-th one of the driving blocks through a second signal line disposed in each of the columns, each of the pixels in the k-th driving block further includes:

a first selecting transistor which includes a gate, a source, and a drain, the gate being connected to the scanning line, one of the source and the drain being connected to the first signal line, and the other of the source and the drain being connected to the gate of the driving transistor, and the first selecting transistor switching between conduction and non-conduction between the first signal line and the gate of the driving transistor, each of the pixels in the (k+1)-th driving block further includes:

a second selecting transistor which includes a gate, a source, and a drain, the gate being connected to the scanning line, one of the source and the drain being connected to the second signal line, the other of the source and the drain being connected to the gate of the driving transistor, and the second selecting transistor switching between conduction and non-conduction between the second signal line and the gate of the driving transistor, all of the first power source lines disposed in the same one of the driving blocks are connected to all of the pixels in the same one of the driving blocks and are not connected to the pixels in different ones of the driving blocks, the image display device further comprises:

a control unit configured to control supply of the reference voltage and a power source voltage to all of the pixels in a same one of the driving blocks with a same timing in a predetermined period to cause all of the threshold voltage detecting units in the same one of the driving blocks to detect the threshold voltage simultaneously, and to control supply of the reference voltage and the power source voltage with a timing different from the timing in different ones of the driving blocks;

the control unit is configured to supply the signal voltage and the reference voltage mutually exclusively to the first signal line and the second signal line, variably drive the power source voltage to be supplied to the first power source line, and, in a period in which the reference voltage is being supplied to the first signal line, change the voltage of all of the first power source lines disposed in the k-th driving block from the first voltage to the second voltage at the same timing, and in a period in which the reference voltage is being supplied to the second signal line, change the voltage of all of the first power source lines disposed in the (k+1)-th driving block from the first voltage to the second voltage at the same driving timing, so that the driving timing is the same in all periods for all of the first power source lines disposed in the same one of the driving blocks, and a threshold voltage correction period in which the reference voltage is applied to the (k+1)-th driving block for threshold voltage correction is provided in a signal voltage storing period in which the signal voltage is sampled in the k-th driving block.

2. The image display device according to claim 1, wherein, where Tf is a period of time for refreshing the signal voltage to all of the pixels, M is a total number of the rows, and N is a total number of the driving blocks, a period of time for detecting the threshold voltage of the driving transistor is longer than 2Tf/M and is up to Tf/N.

3. A method of driving an image display device including a plurality of pixels and a first power source line, the pixels being arranged in rows and columns and making up two or more driving blocks, each of the driving blocks including plural pixel rows, and the first power source line being connected to all of the pixels in the same one of the driving blocks and not connected to the pixels in different ones of the driving blocks, each of the pixels including:

a driving transistor which converts a signal voltage which determines luminous intensity into a driving current according to the signal voltage applied to a gate of the driving transistor;

a luminescence element which generates photons according to the driving current flowing through the luminescence element; and a threshold voltage detecting unit configured to detect a threshold voltage of the driving transistor while a reference voltage is applied to the threshold voltage detecting unit, the threshold voltage detecting unit being made up of a storing capacitive element having a terminal connected to the gate of the driving transistor and another terminal connected to one of a source and a drain of the driving transistor, and the first power source line being disposed in each of the rows and connected to the other of the source and the drain of the driving transistor, the method comprising:

supplying the reference voltage to all pixels in the same one of the driving blocks at the same timing to cause all of the threshold voltage detecting units in the same one of the driving blocks to simultaneously detect the threshold voltage, and applying the reference voltage to the gate of all of the driving transistors in a k-th one of the driving blocks simultaneously through a first signal line disposed in each of the columns to simultaneously store a voltage corresponding to the threshold voltage of the driving transistor into all of the threshold voltage detecting units of the driving block, where k is a positive integer;

applying the signal voltage, in a pixel row-sequence, to the gate of all of the driving transistors of the k-th driving block through the first signal line, after the applying of the reference voltage in the k-th driving block, to store, in the pixel row-sequence, a voltage corresponding to the signal voltage into the threshold voltage detecting units of the k-th driving block in which the threshold voltage has been stored; and applying the reference voltage to the gate of all of the driving transistors of a (k+1)-th one of the driving blocks simultaneously through a second signal line which is disposed in each of the columns and is different from the first signal line, after the applying of the reference voltage in the k-th driving block, to simultaneously store the voltage corresponding to the threshold voltage of the driving transistor into all of the threshold voltage detecting units of the driving block;

wherein the applying of the reference voltage in the k-th driving block includes:

simultaneously applying a first voltage lower than the reference voltage to all of the first power source lines of the k-th driving block to reset a potential of one of the source and the drain of the driving transistor;

simultaneously applying the reference voltage to the gate of all driving transistors of the k-th driving block through the first signal line after simultaneously applying the first voltage; and simultaneously applying a second voltage higher than the reference voltage to all of the first power source lines of the k-th driving block to cause the storing capacitive element to store the threshold voltage, after simultaneously applying the reference voltage in the k-th driving block, the applying of the reference voltage in the (k+1)-th driving block includes:

simultaneously applying the first voltage to all of the first power source lines of the (k+1)-th driving block to reset a potential of one of the source and the drain of the driving transistor;

simultaneously applying the reference voltage to the gate of all of the driving transistors of the (k+1)-th driving block through the second signal line, after simultaneously applying the first voltage in the (k+1)-th driving block; and simultaneously applying the second voltage to all of the first power source lines of the (k+1)-th driving block to cause the storing capacitive element to store the threshold voltage, after simultaneously applying the reference voltage in the (k+1)-th driving block, and a threshold voltage correction period in which the reference voltage is applied to the (k+1)-th driving block for threshold voltage correction is provided in a signal voltage storing period in which the signal voltage is sampled in the k-th driving block.

4. The method according to claim 3, wherein in the applying of the signal voltage, a drain current of the driving transistor is passed through all of the luminescence elements of the k-th driving block in the pixel row-sequence to cause the luminescence elements to generate photons simultaneously with storing of the voltage corresponding to the signal voltage into the threshold voltage detecting units in the pixel row-sequence; and the method further comprises applying the signal voltage to the gate of all of the driving transistors of the (k+1)-th driving block through the second signal line in the pixel row-sequence, after the applying of the reference voltage in the (k+1)-th driving block, to store, in the pixel row-sequence, the voltage corresponding to the signal voltage into the threshold voltage detecting units of the (k+1)-th driving block into which the threshold voltage has been stored and passing a drain current of the driving transistor through all of the luminescence elements of the (k+1)-th driving block in the pixel row-sequence to cause the luminescence elements to generate photons.

5. The method according to claim 3, wherein the applying of the reference voltage in the k-th driving block further includes simultaneously bringing the first signal line and the gate of all of the driving transistors of the k-th driving block out of conduction, after simultaneously applying the second voltage; and the applying of the reference voltage in the (k+1)-th driving block further includes simultaneously bringing the second signal line and the gate of all of the driving transistors of the (k+1)-th driving block out of conduction, after simultaneously applying the second voltage in the (k+1)-th driving block.

6. An image display device including a plurality of pixels arranged in rows and columns, the image display device comprising:

a scanning line disposed in each of the rows;

a first power source line which is disposed in each of the rows and supplies a first voltage lower than a reference voltage and a second voltage higher than the reference voltage; and a second power source line, wherein each of the pixels includes:

a driving transistor which converts a signal voltage which determines luminous intensity into a driving current according to the signal voltage applied to a gate of the driving transistor;

a luminescence element which includes a terminal connected to the second power source line and another terminal connected to one of a source and a drain of the driving transistor, and generates photons in response to the driving current flowing through the luminescence element; and a threshold voltage detecting unit which includes a storing capacitive element and is configured to detect a threshold voltage of the driving transistor while the reference voltage is applied to the gate of the driving transistor, the storing capacitive element having a terminal connected to the gate of the driving transistor and another terminal connected to the one of the source and the drain of the driving transistor, and storing at least a voltage corresponding to the signal voltage or the reference voltage, the other of the source and the drain of the driving transistor is connected to the first power source line, the pixels make up at least two or more driving blocks, each of the driving blocks including plural pixel rows, the signal voltage and the reference voltage are applied to the gate of the driving transistor of a pixel in a k-th one of the driving blocks through a first signal line disposed in each of the columns, where k is a positive integer, the signal voltage and the reference voltage are applied to the gate of the driving transistor of a pixel in a (k+1)-th one of the driving blocks through a second signal line disposed in each of the columns, each of the pixels in the k-th driving block further includes:

a first selecting transistor which includes a gate, a source, and a drain, the gate being connected to the scanning line, one of the source and the drain being connected to the first signal line, and the other of the source and the drain being connected to the gate of the driving transistor, and the first selecting transistor switching between conduction and non-conduction between the first signal line and the gate of the driving transistor, each of the pixels in the (k+1)-th driving block further includes:

a second selecting transistor which includes a gate, a source, and a drain, the gate being connected to the scanning line, one of the source and the drain being connected to the second signal line, the other of the source and the drain being connected to the gate of the driving transistor, and the second selecting transistor switching between conduction and non-conduction between the second signal line and the gate of the driving transistor, all of the first power source lines disposed in the same one of the driving blocks are connected to all of the pixels in the same one of the driving blocks and are not connected to the pixels in different ones of the driving blocks, the image display device further comprises:

a control unit configured to control supply of the reference voltage and a power source voltage to all of the pixels in a same one of the driving blocks with a same timing in a predetermined period to cause all of the threshold voltage detecting units in the same one of the driving blocks to detect the threshold voltage simultaneously, and to control supply of the reference voltage and the power source voltage with a timing different from the timing in different ones of the driving blocks, the control unit is configured to supply the signal voltage and the reference voltage mutually exclusively to the first signal line and the second signal line, variably drive the power source voltage to be supplied to the first power source line, and, in a period in which the reference voltage is being supplied to the first signal line, change the voltage of all of the first power source lines disposed in the k-th driving block from the first voltage to the second voltage at the same timing, and in a period in which the reference voltage is being supplied to the second signal line, change the voltage of all of the first power source lines disposed in the (k+1)-th driving block from the first voltage to the second voltage at the same driving timing, so that the driving timing is the same in all periods for all of the first power source lines disposed in the same one of the driving blocks;

a threshold voltage detection period is provided in common for the pixels in a same one of the driving blocks, and the threshold voltage detection period provided in common for the pixels in the same one of the driving blocks is provided independently for the pixels in different ones of the driving blocks, the threshold voltage detection period being a period during which a threshold voltage of the driving transistor is detected by controlling the first power source line, and a threshold voltage correction period in which the reference voltage is applied to the k+1 block for threshold voltage correction is provided in a signal voltage storing period in which the signal voltage is sampled in the k-th driving block.

* * * * *